United States Patent
Mitsunaga et al.

(10) Patent No.: US 10,798,428 B2
(45) Date of Patent: Oct. 6, 2020

(54) METHOD AND SYSTEM FOR PROVIDING COUPON

(71) Applicant: SONY CORPORATION, Tokyo (JP)

(72) Inventors: Tomoo Mitsunaga, Kanagawa (JP); Kensei Jo, Kumamoto (JP); Hiroaki Takahashi, Tokyo (JP); Takeyuki Fujii, Kanagawa (JP); Junichi Kosaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1 day.

(21) Appl. No.: 15/522,824

(22) PCT Filed: Sep. 18, 2015

(86) PCT No.: PCT/JP2015/076738
§ 371 (c)(1),
(2) Date: Apr. 28, 2017

(87) PCT Pub. No.: WO2016/076013
PCT Pub. Date: May 19, 2016

(65) Prior Publication Data
US 2017/0318318 A1 Nov. 2, 2017

(30) Foreign Application Priority Data

Nov. 12, 2014 (JP) .................. 2014-229656

(51) Int. Cl.
*H04N 7/16* (2011.01)
*H04N 21/234* (2011.01)
(Continued)

(52) U.S. Cl.
CPC ....... *H04N 21/23424* (2013.01); *G06F 3/048* (2013.01); *G06Q 30/02* (2013.01);
(Continued)

(58) Field of Classification Search
CPC .......... H04N 21/23424; H04N 21/235; H04N 21/237; H04N 21/26613; H04N 21/4126;
(Continued)

(56) References Cited

U.S. PATENT DOCUMENTS

2010/0260426 A1* 10/2010 Huang ............... G06K 9/20
   382/218
2012/0136698 A1* 5/2012 Kent ............... H06Q 20/3276
   705/14.1

(Continued)

FOREIGN PATENT DOCUMENTS

JP    2008-225903 A    9/2008
JP    2010-525462 A    7/2010
(Continued)

*Primary Examiner* — Kyu Chae
(74) *Attorney, Agent, or Firm* — Chip Law Group

(57) ABSTRACT

A method to improve convenience for providing a coupon with the use of a spatial or temporal modulation component added to light that can be captured while a service is being used. Provided is a method for providing a coupon by using a terminal device and at least one server configured to provide a service to the terminal device, the method includes capturing light while the service is being used, transmitting key information based on a spatial or temporal modulation component of the light to the server, and receiving coupon information related to the service transmitted from the server by using the terminal device; and receiving the key information from the terminal device and issuing the coupon information in accordance with the key information by using the server.

14 Claims, 21 Drawing Sheets

(51) Int. Cl.
- *G06Q 30/02* (2012.01)
- *G06F 3/048* (2013.01)
- *H04N 21/235* (2011.01)
- *H04N 21/237* (2011.01)
- *H04N 21/266* (2011.01)
- *H04N 21/41* (2011.01)
- *H04N 21/44* (2011.01)
- *H04N 21/4784* (2011.01)
- *H04N 21/81* (2011.01)
- *H04N 21/83* (2011.01)

(52) U.S. Cl.
CPC ....... *G06Q 30/0255* (2013.01); *H04N 21/235* (2013.01); *H04N 21/237* (2013.01); *H04N 21/26613* (2013.01); *H04N 21/4126* (2013.01); *H04N 21/44008* (2013.01); *H04N 21/4784* (2013.01); *H04N 21/812* (2013.01); *H04N 21/83* (2013.01)

(58) Field of Classification Search
CPC ......... H04N 21/44008; H04N 21/4784; H04N 21/812; H04N 21/83; G06Q 30/0255
See application file for complete search history.

(56) References Cited

U.S. PATENT DOCUMENTS

| | | | |
|---|---|---|---|
| 2014/0286644 A1* | 9/2014 | Oshima | H04B 10/11 398/118 |
| 2015/0193982 A1* | 7/2015 | Mihelich | H04W 4/026 345/633 |
| 2015/0215674 A1* | 7/2015 | Provencher | H04N 21/4725 725/60 |
| 2015/0363781 A1* | 12/2015 | Badenhorst | G06Q 20/385 705/44 |

FOREIGN PATENT DOCUMENTS

| | | |
|---|---|---|
| JP | 2013-152517 A | 8/2013 |
| JP | 5608307 B1 | 10/2014 |

* cited by examiner

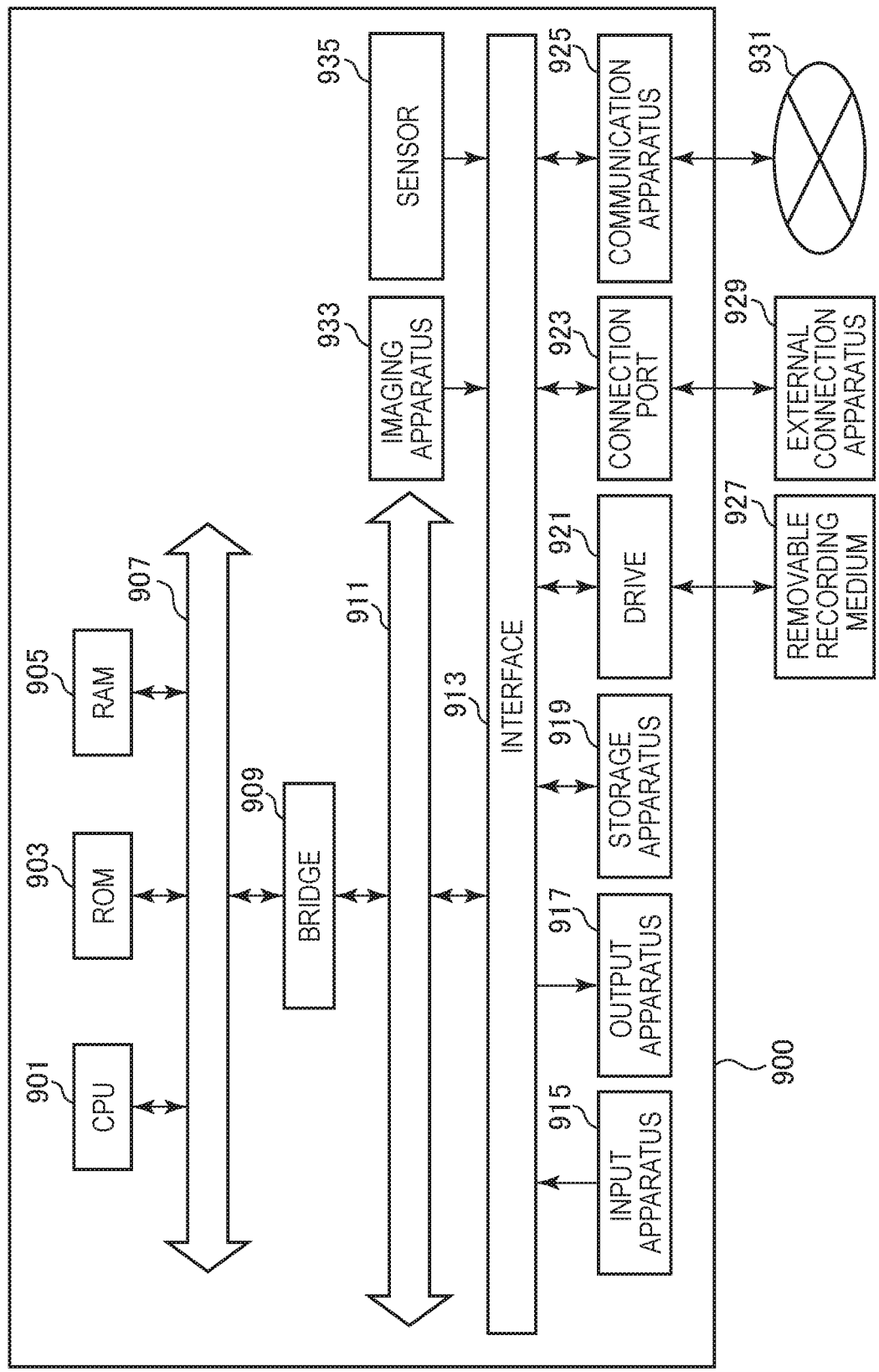

METHOD AND SYSTEM FOR PROVIDING COUPON

CROSS REFERENCE TO RELATED APPLICATIONS

This application is a U.S. National Phase of International Patent Application No. PCT/JP2015/076738 filed on Sep. 18, 2015, which claims priority benefit of Japanese Patent Application No. JP 2014-229656 filed in the Japan Patent Office on Nov. 12, 2014. Each of the above-referenced applications is hereby incorporated herein by reference in its entirety.

TECHNICAL FIELD

The present disclosure relates to a method and system for providing a coupon.

BACKGROUND ART

In various services, provision of coupons to users who use the services is generally performed. Electronical provision of coupons via the Internet is also widely performed. For example, there is known provision of a coupon using near field communication (NFC), a barcode, a two-dimensional code, or the like. Furthermore, in recent years, there has been proposed a technique of providing a coupon to a user who views an image with the use of a technique of embedding a watermark or the like in an image, i.e., so-called digital watermarking. An example of such a technique is disclosed in Patent Literature 1.

CITATION LIST

Patent Literature

Patent Literature 1: JP 2008-225903A

DISCLOSURE OF INVENTION

Technical Problem

However, in a case where digital watermarking is used for providing a coupon, it is necessary to determine content of a coupon when an image is prepared, and therefore it is difficult to flexibly change the content of the coupon. Further, although the same applies to a coupon provided by using an image of another method, it is possible to copy the coupon by copying the image, and therefore it is difficult to limit a target to which the coupon is provided. As described above, a method for electronically providing a coupon to a user who uses a service still needs to be improved.

In view of this, the present disclosure proposes a method and system for providing a coupon, each of which is new, improved, and capable of improving convenience for providing a coupon with the use of a spatial or temporal modulation component added to light that can be captured while a service is being used.

Solution to Problem

According to the present disclosure, there is provided a method for providing a coupon by using a terminal device and at least one server configured to provide a service to the terminal device, the method including: capturing light while the service is being used, transmitting key information based on a spatial or temporal modulation component of the light to the server, and receiving coupon information related to the service transmitted from the server by using the terminal device; and receiving the key information from the terminal device and issuing the coupon information in accordance with the key information by using the server.

In addition, according to the present disclosure, there is provided a system including a terminal device and at least one server configured to provide a service to the terminal device. The terminal device includes a capturing unit configured to capture light while the service is being used, a transmission unit configured to transmit key information based on a spatial or temporal modulation component of the light to the server, and a reception unit configured to receive coupon information related to the service transmitted from the server. The server includes a reception unit configured to receive the key information from the terminal device, a coupon issuance unit configured to issue the coupon information in accordance with the key information, and a transmission unit configured to transmit the coupon information to the terminal device.

Advantageous Effects of Invention

As described above, according to the present disclosure, it is possible to improve convenience for providing a coupon with the use of a spatial or temporal modulation component added to light that can be captured while a service is being used.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 21 is a block diagram showing a hardware configuration example of an information processing apparatus according to an embodiment of the present disclosure.

MODE(S) FOR CARRYING OUT THE INVENTION

Figure 1:
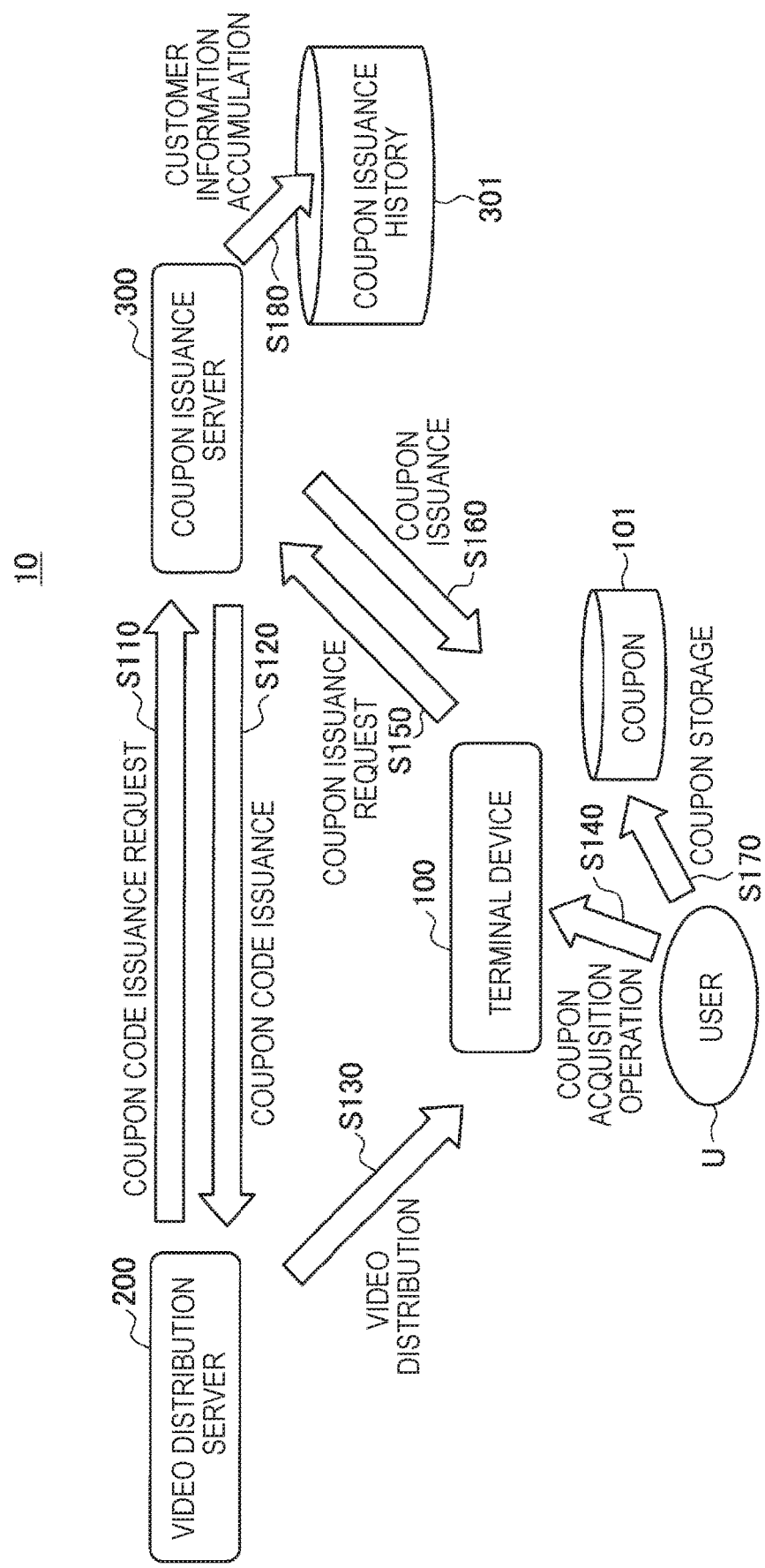
FIG. 1 is a diagram showing a system according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. First Embodiment
2 Second embodiment
3. Third Embodiment
4. Fourth Embodiment
5. Fifth Embodiment
6. Sixth Embodiment
7. Hardware configuration
8. Supplement

1. First Embodiment

FIG. 1 is a diagram showing a system according to a first embodiment of the present disclosure. When referring to FIG. 1, a system 10 includes a terminal device 100, a video distribution server 200, and a coupon issuance server 300. The terminal device 100 is, for example, a television, a smartphone, or a tablet and has a function for watching a distributed video. The video distribution server 200 and the coupon issuance server 300 provide a video distribution service to the terminal device 100. Note that the video distribution service is an example of a service including provision of an image. All the terminal device 100, the video distribution server 200, and the coupon issuance server 300 can be realized by, for example, a hardware configuration of an information processing apparatus described below. Hereinafter, the present embodiment will be further described with reference to operation of each apparatus in the system 10.

First, in a case where a video is distributed, the video distribution server 200 requests the coupon issuance server 300 to issue a coupon code (S110). The coupon issuance server 300 issues a coupon code in response to this request (S120). Herein, the coupon code is a code for recognizing a coupon corresponding to a video distributed by the video distribution server 200 among coupons that can be issued by the coupon issuance server 300. With this, the coupon issuance server 300 can also issue a coupon related to a service provided by a server other than the video distribution server 200. Further, the coupon issuance server 300 can issue different coupons for a plurality of videos distributed by the video distribution server 200.

The video distribution server 200 that has received the coupon code distributes a video to the terminal device 100 (S130). At this time, the coupon code is distributed together therewith to the terminal device 100 as metadata of the video. A user U watches the distributed video on the terminal device 100. At this time, the user U may be notified that a coupon can be acquired by operation described below.

The user U executes acquisition operation of the coupon while watching the video (S140). In the present embodiment, the acquisition operation of the coupon is to select a position in the vicinity of a subject desired by the user U in the video displayed on the terminal device 100. An example of such operation is shown in FIG. 2.

Figure 2:
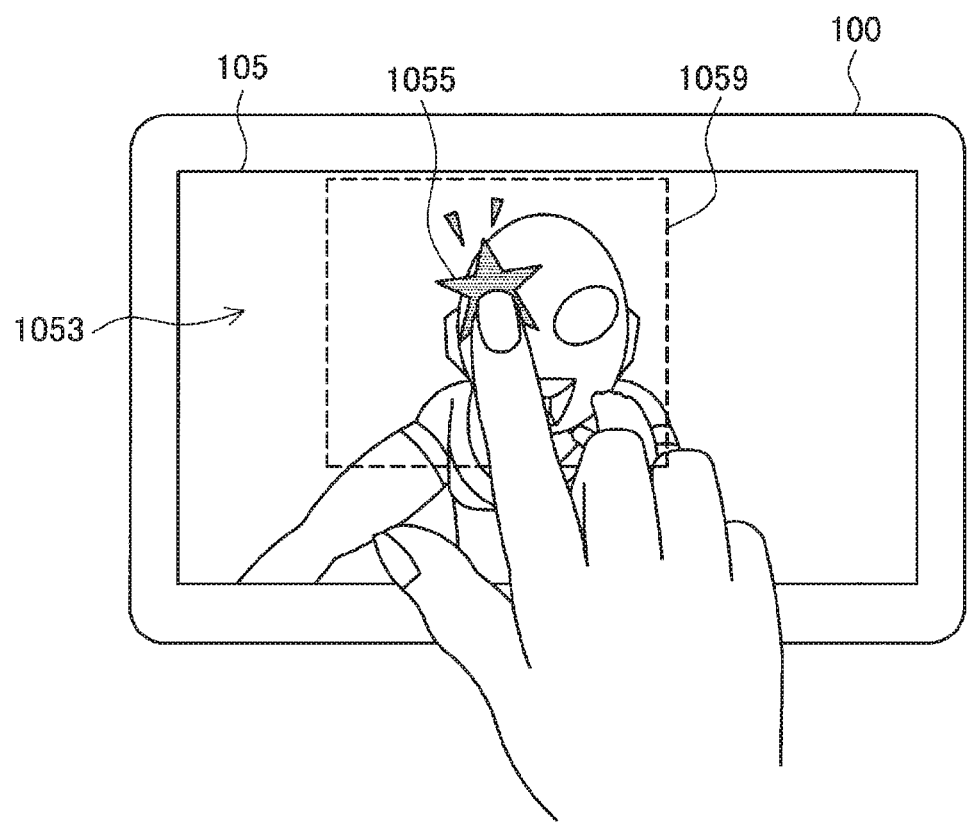
FIG. 2 is a diagram for explaining acquisition operation of a coupon in the first embodiment of the present disclosure.

FIG. 2 is a diagram for explaining acquisition operation of a coupon in the first embodiment of the present disclosure. In the example shown in FIG. 2, the terminal device 100 includes a display 105, and a touchscreen is provided on the display 105. When a video 1053 is displayed on the display 105, the user touches a position 1055. With this operation, the terminal device 100 captures a region 1059 surrounding the position 1055. In other words, the terminal device 100 captures a spatial part of display light of an image constituting the video 1053. Herein, luminance and chromaticity of the display light of the image are different between pixels in order to display the video 1053. In other words, it can be said that the display light of the image is spatially modulated. In the present embodiment, key information for coupon issuance is extracted from such a spatial modulation component of the display light.

When referring to FIG. 1 again, the terminal device 100 transmits a coupon issuance request to the coupon issuance server 300 (S150) in a case where the coupon acquisition operation (S140) is executed. At this time, the coupon issuance request includes a coupon code and information indicating spatial modulation of display light in a video part captured in the coupon acquisition operation (S140). As described above, in the present embodiment, this information is treated as the key information for coupon issuance. The coupon issuance server 300 that has received the coupon issuance request (S150) detects a subject included in the video part (region 1059 shown in FIG. 2) captured in the coupon acquisition operation (S140) on the basis of a spatial modulation component of the display light included in the key information and issues a coupon related to the subject (S160). The coupon issuance server 300 transmits coupon information indicating the issued coupon to the terminal device 100.

The terminal device 100 that has received the coupon information stores a coupon 101 (S170). It is possible to use the stored coupon 101 by, for example, displaying the coupon on a display as an image or printing out the coupon. As such a coupon, it is possible to provide, for example, an invitation ticket of an event regarding content distributed as a video, a coupon for obtaining some privilege in the event, or a discount ticket of a commercial product related to the content. Meanwhile, in the coupon issuance server 300, information on the user U serving as a target to which the coupon is issued is accumulated in a coupon issuance history 301 as customer information (S180).

Figure 3:
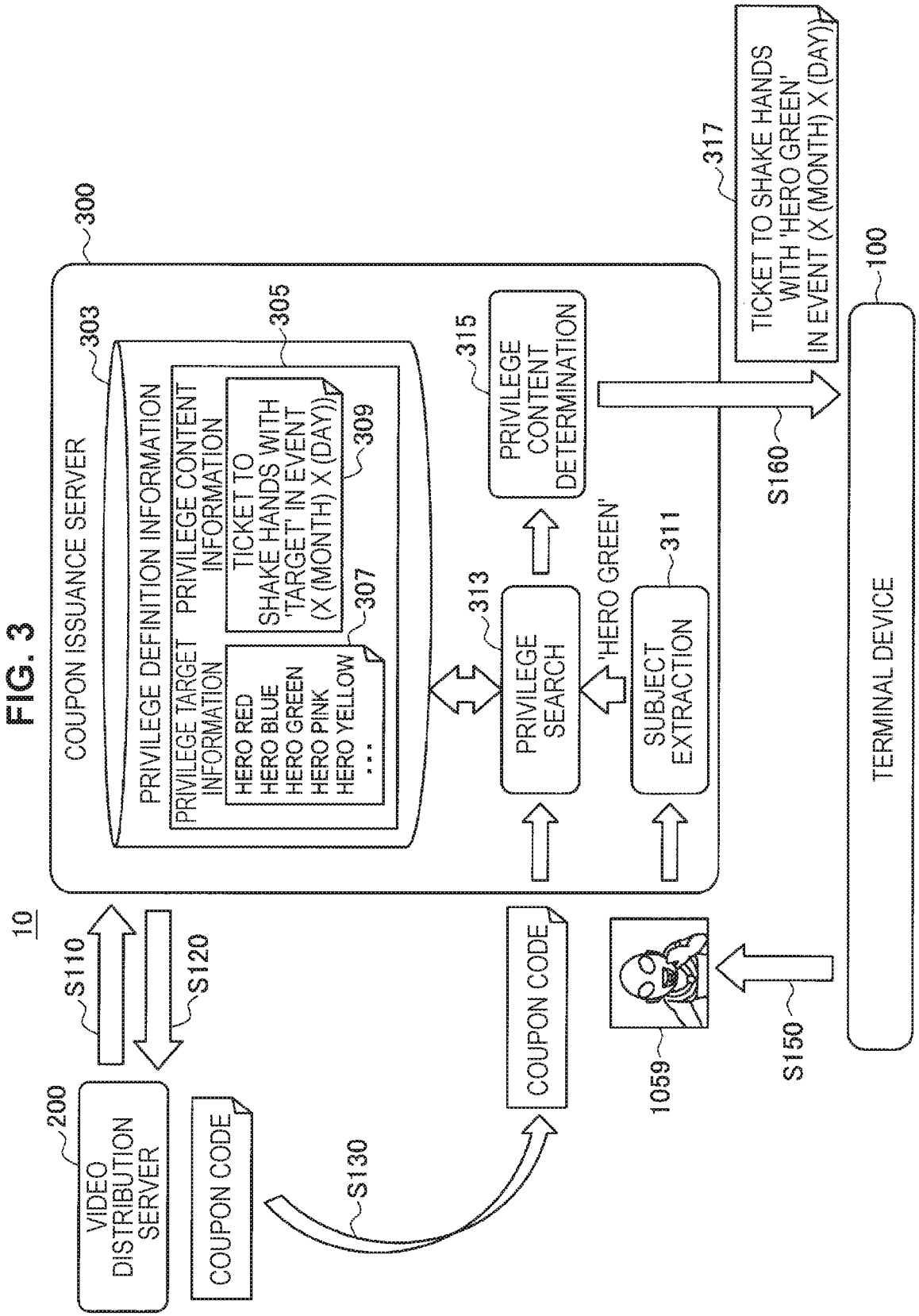
FIG. 3 is a diagram showing a configuration of a coupon issuance server according to the first embodiment of the present disclosure.

FIG. 3 is a diagram showing a configuration of the coupon issuance server according to the first embodiment of the present disclosure. When referring to FIG. 3, the coupon issuance server 300 includes a storage unit 303, a subject extraction unit 311, a privilege search unit 313, and a privilege content determination unit 315. Herein, the storage unit 303 is realized by a memory or storage included in the information processing apparatus that realizes the coupon issuance server 300. Further, the subject extraction unit 311, the privilege search unit 313, and the privilege content determination unit 315 are realized in such a way that a processor such as a central processing unit (CPU) included in the information processing apparatus operates in accordance with a program stored in the memory or storage. Hereinafter, a function of each unit will be described. Note that operation in S110 to S160 shown in FIG. 3 is the same as the above operation shown in FIG. 2.

In the coupon issuance server 300, privilege definition information 305 is stored on the storage unit 303. In the example shown in FIG. 3, the coupon issuance server 300 issues a coupon for obtaining some privilege in an event regarding content distributed as a video by the video distribution server 200. The privilege definition information 305 defines content of the coupon in accordance with a coupon code issued by the coupon issuance server 300 to the video distribution server 200. A plurality of pieces of privilege definition information 305 for respective coupon codes may be stored on the storage unit 303. In the example shown in FIG. 3, the privilege definition information 305 includes privilege target information 307 and privilege content information 309. Herein, the privilege content information 309 defines a "ticket to shake hands with a 'target' in the event". Meanwhile, the privilege target information 307 defines a character (hero red, hero blue, . . . ) of the content which can be a target of the privilege.

Herein, the coupon issuance request (S150) transmitted from the terminal device 100 to the coupon issuance server 300 includes the coupon code distributed together with the video from the video distribution server 200 and information indicating the region 1059 of the video captured in the coupon acquisition operation (S140) by the user in the terminal device 100. In the coupon issuance server 300, the subject extraction unit 311 implements image recognition processing regarding the region 1059 and extracts a subject (hero green in the example shown in FIG. 3) included in the region 1059. The privilege search unit 313 searches a privilege to be provided to the user on the basis of the extracted subject and the coupon code. As a result, the privilege content information 309 is specified on the basis of the coupon code, and one of subjects defined by the privilege target information 307 is specified on the basis of the extracted subject. As a result, the privilege content determination unit 315 determines a privilege content 317 indicating a "ticket to shake hands with the 'hero green' in the event", and coupon information for allowing this privilege to be usable is transmitted to the terminal device 100 (S160).

Figure 4:
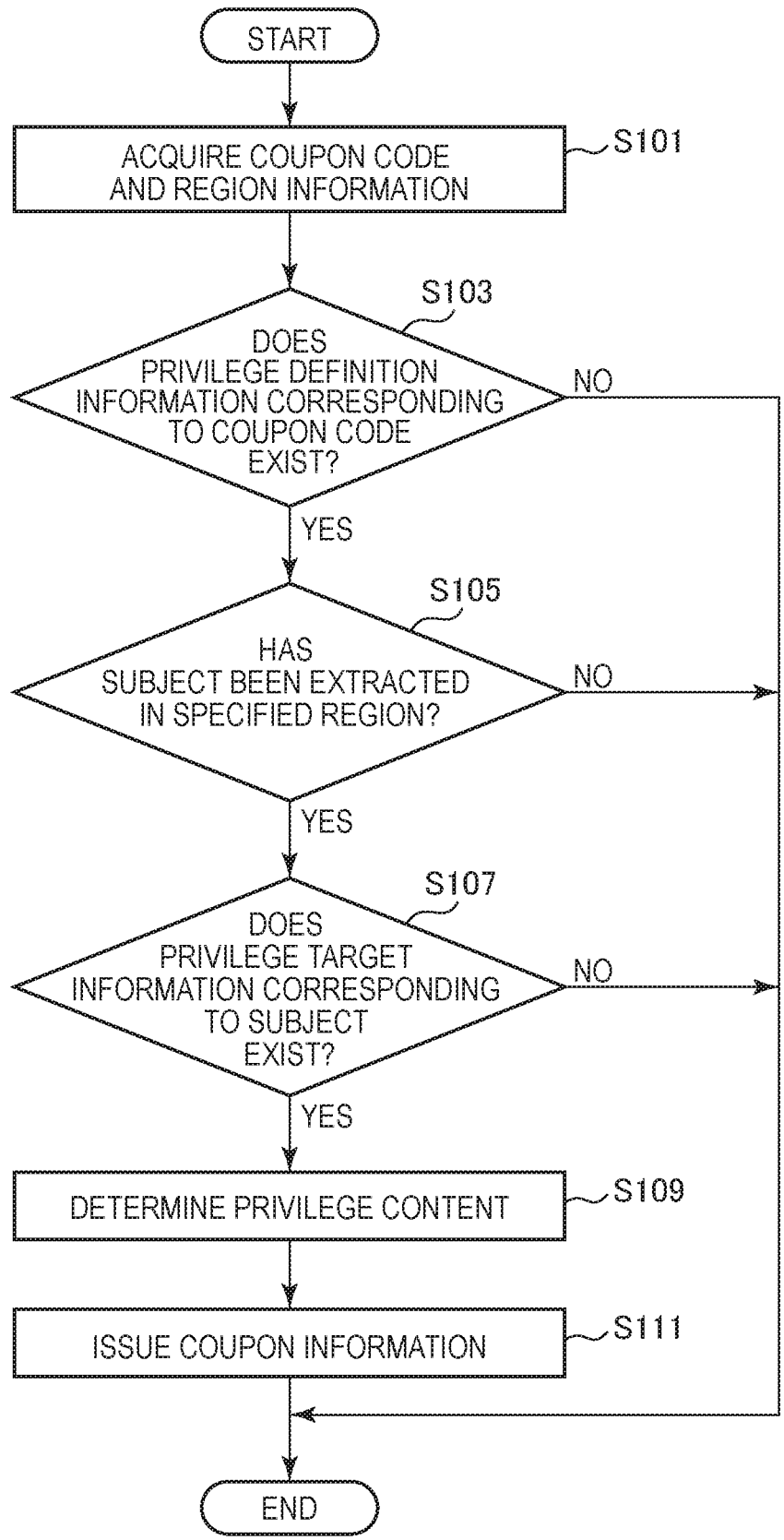
FIG. 4 is a flowchart showing an example of processing of the coupon issuance server in the first embodiment of the present disclosure.

FIG. 4 is a flowchart showing an example of processing of the coupon issuance server in the first embodiment of the present disclosure. When referring to FIG. 4, first, the coupon issuance server 300 acquires a coupon code transmitted from the terminal device 100 and information on a specified region in a video (S101). Then, the coupon issuance server 300 determines whether or not the privilege definition information 305 corresponding to the acquired coupon code is registered (S103). Herein, in a case where the privilege definition information 305 corresponding to the coupon code is registered, the coupon issuance server 300 further determines whether or not a subject is extracted from the region in the video specified by key information (S105). This determination is executed in such a way that, for example, the subject extraction unit 311 attempts extraction of the subject by the image recognition processing.

In a case where the subject is extracted in S105, the coupon issuance server 300 further determines whether or not the privilege target information 307 corresponding to the extracted subject exists (S107). This determination is executed in such a way that, for example, the privilege search unit 313 searches a target corresponding to the extracted subject from targets registered in the privilege target information 307. Herein, in a case where the privilege target information 307 corresponding to the extracted subject exists, the coupon issuance server 300 determines a privilege content on the basis of the privilege target information 307 and the privilege content information 309 (S109). Furthermore, the coupon issuance server 300 issues coupon information in accordance with the determined privilege content (S111).

Figure 5:
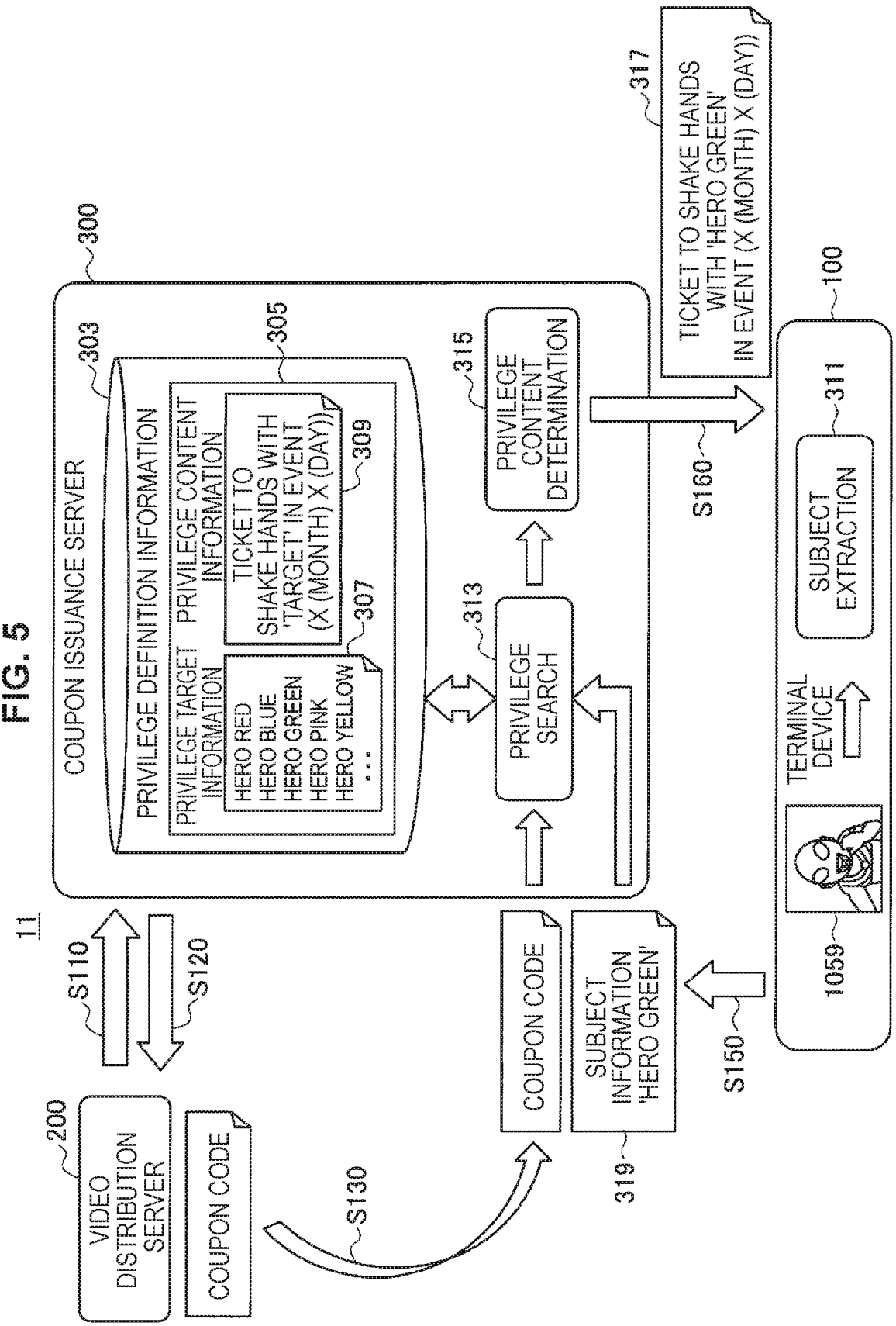
FIG. 5 is a diagram showing a modification example of the first embodiment of the present disclosure.

FIG. 5 is a diagram showing a modification example of the first embodiment of the present disclosure. When referring to FIG. 5, in a system 11 according to the present modification example, the coupon issuance server 300 does not include the subject extraction unit 311. Instead, the terminal device 100 includes the subject extraction unit 311 and executes processing for extracting a subject (hero green in the example shown in FIG. 5) included in the region 1059 by image recognition. Therefore, in the present modification example, a coupon issuance request (S150) transmitted from the terminal device 100 to the coupon issuance server 300 includes a coupon code distributed together with a video from the video distribution server 200 and information 319 indicating the subject extracted in the terminal device 100.

In the first embodiment of the present disclosure described above, a service includes provision of a video constituted of an image. The terminal device 100 captures a specified region in the video while the service is being used. In other words, the terminal device 100 captures a spatial part of display light of the image constituting the video. In the present embodiment, key information for coupon issuance relates to a subject expressed by a spatial modulation component of the display light (in other words, luminance and chromaticity for displaying the image) in the part captured as described above. More specifically, for example, the terminal device 100 may transmit a spatial modulation component of the display light in the captured part to the coupon issuance server 300 as key information, and the coupon issuance server 300 may detect a subject on the basis of the key information. Alternatively, the terminal device 100 may detect the subject on the basis of the spatial modulation component of the display light in the captured part and transmit information indicating the detected subject to the coupon issuance server 300 as key information. The coupon issuance server 300 issues a coupon related to the detected subject.

With this configuration, for example, even in a case where a video of a single content is distributed, it is possible to issue different coupons for respective subjects appearing therein. For example, in the example of the handshake ticket shown in FIG. 3, it is possible to issue a coupon for shaking hands with different subjects (heroes) in accordance with a subject included in a video part selected by the user. Further, the coupon is issued when the terminal device 100 transmits a coupon issuance request to the coupon issuance server 300, and therefore it is possible to perform detailed control related to an issuance period of the coupon or the like, such as control that allows the coupon to be issued only while a program is being broadcasted (the coupon is issued only to a user who watches the program in real time) or control that allows the coupon to be issued only in a predetermined period after start of distribution of content distributed on demand (the coupon is issued only to a user who watches the content immediately after the content is released).

Note that, as a further modification example, in a case where acquisition operation of a coupon is executed in the terminal device 100, the whole video may be captured instead of a part of the video (the region 1059 in the example of FIG. 2). In this case, what is captured while a service is being used is one or a plurality of frames among consecutive frame images constituting the video. Therefore, in this case, it is said that a temporal part of display light of the images constituting the video is captured while the service is being used. Also in this case, for example, in a case where a subject included in the captured frame image (for example, a subject included in a list of the privilege target information 307 in the example of FIG. 3) can be specified, it is possible to issue a coupon related to the subject as in the above example.

2. Second Embodiment

Figure 6:
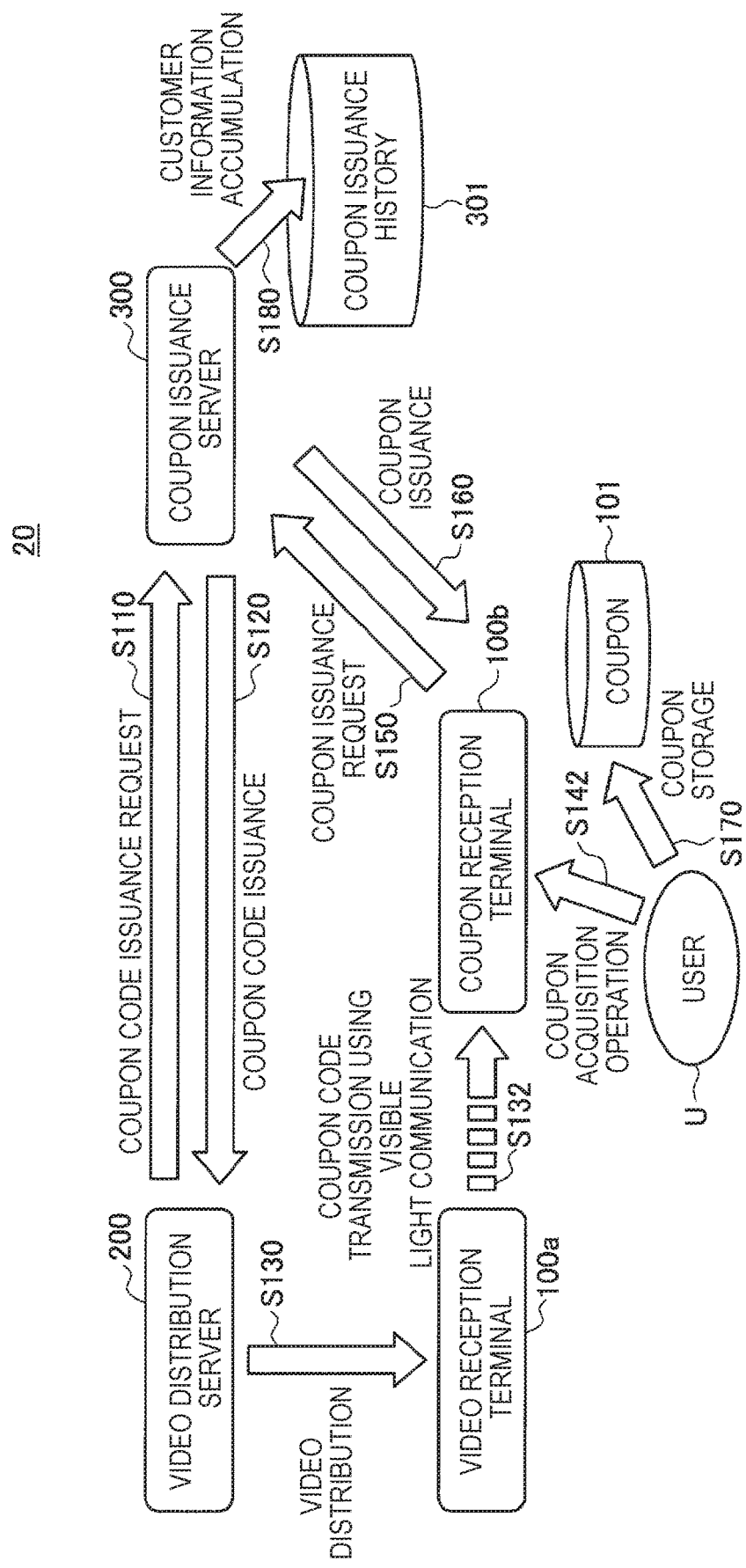
FIG. 6 is a diagram showing a system according to a second embodiment of the present disclosure.

FIG. 6 is a diagram showing a system according to a second embodiment of the present disclosure. When referring to FIG. 6, a system 20 includes a video reception terminal 100*a*, a coupon reception terminal 100*b*, the video distribution server 200, and the coupon issuance server 300. The video reception terminal 100*a* is, for example, a television, a personal computer, or the like and has a function for watching a distributed video. The coupon reception terminal 100*b* is, for example, a smartphone, a tablet, or the like and has a function of acquiring a taken image including a video displayed on the video reception terminal 100*a*. Note that a video distribution service is an example of a service including provision of an image. Both the video reception terminal 100*a* and the coupon reception terminal 100*b* can be realized by, for example, the hardware configuration of the information processing apparatus described below. Hereinafter, the present embodiment will be further described with reference to operation of each apparatus in the system 20. Note that the configurations of the video distribution server 200 and the coupon issuance server 300 are similar to the configurations thereof in the above first embodiment, and therefore repeated description is omitted.

When referring to FIG. 6, in the system 20, the coupon issuance server 300 issues a coupon code in response to a request (S110) of the video distribution server 200 (S120), and a video is distributed from the video distribution server 200 to the video reception terminal 100*a* (S130). The coupon code is expressed by a temporal modulation component of display light of an image as described below. The video reception terminal 100*a* that displays the distributed video transmits the coupon code to the coupon reception terminal 100*b* via visible light communication (S132). Note that details of the visible light communication will be described below.

The user U executes acquisition operation of a coupon with the use of the coupon reception terminal 100*b* while watching the video on the video reception terminal 100*a* (S142). In the present embodiment, the acquisition operation of the coupon is to take a video displayed on the video reception terminal 100*a* with the use of a camera of the coupon reception terminal 100*b*. An example of such operation is shown in FIG. 7.

Figure 7:
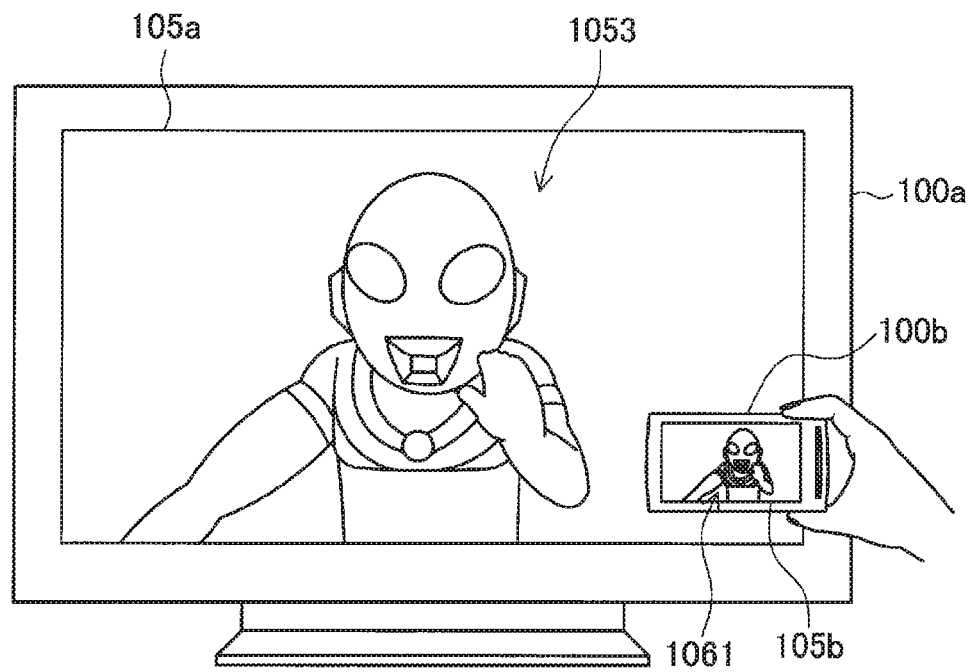
FIG. 7 is a diagram for explaining acquisition operation of a coupon in the second embodiment of the present disclosure.

FIG. 7 is a diagram for explaining acquisition operation of a coupon in the second embodiment of the present disclosure. In the example shown in FIG. 7, a video 1053 is displayed on a display 105*a* included in the video reception terminal 100*a*. The user takes an image of the display 105*a* on which the video 1053 is displayed with the use of the camera of the coupon reception terminal 100*b*. In FIG. 7, a taken image 1061 is displayed on a display 105*b* of the coupon reception terminal 100*b*. With this operation, the coupon reception terminal 100*b* captures display light of an image constituting the video 1053. As described below, the display light captured herein includes a temporal modulation component. In the present embodiment, a coupon code serving as key information for coupon issuance is extracted from such a temporal modulation component of the display light.

When referring to FIG. 6 again, in a case where the acquisition operation of the coupon (S142) is executed, the coupon reception terminal 100*b* transmits a coupon issuance request to the coupon issuance server 300 (S150). The coupon issuance request includes the coupon code extracted by demodulating the temporal modulation component included in the display light of the video 1053 captured in the coupon acquisition operation (S142). The coupon issuance request may further include information indicating spatial modulation of the display light of the captured video (for example, data of taken image). The coupon issuance server 300 that has received the coupon issuance request (S150) issues a coupon corresponding to the coupon code (S160). At this time, the coupon issuance server 300 may detect a subject included in the captured video and issue a coupon related to the subject. The coupon issuance server 300 transmits coupon information indicating the issued coupon to the coupon reception terminal 100*b*, and the coupon reception terminal 100*b* stores the coupon 101 (S170). Further, the coupon issuance server 300 accumulates information on the user U in the coupon issuance history 301 (S180).

Figure 8:
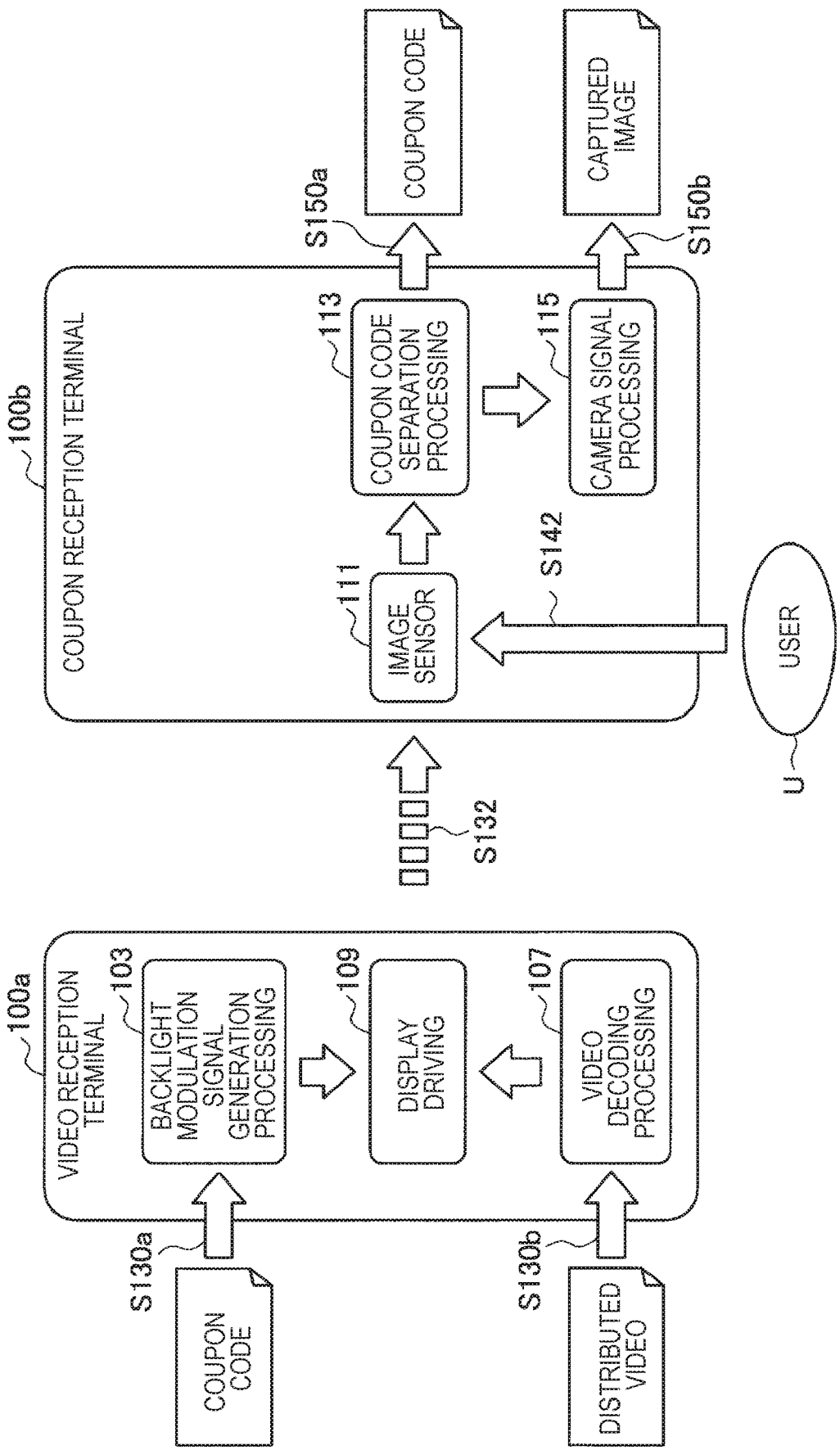
FIG. 8 is a diagram for explaining a configuration regarding visible light communication in the second embodiment of the present disclosure.
Figure 9:
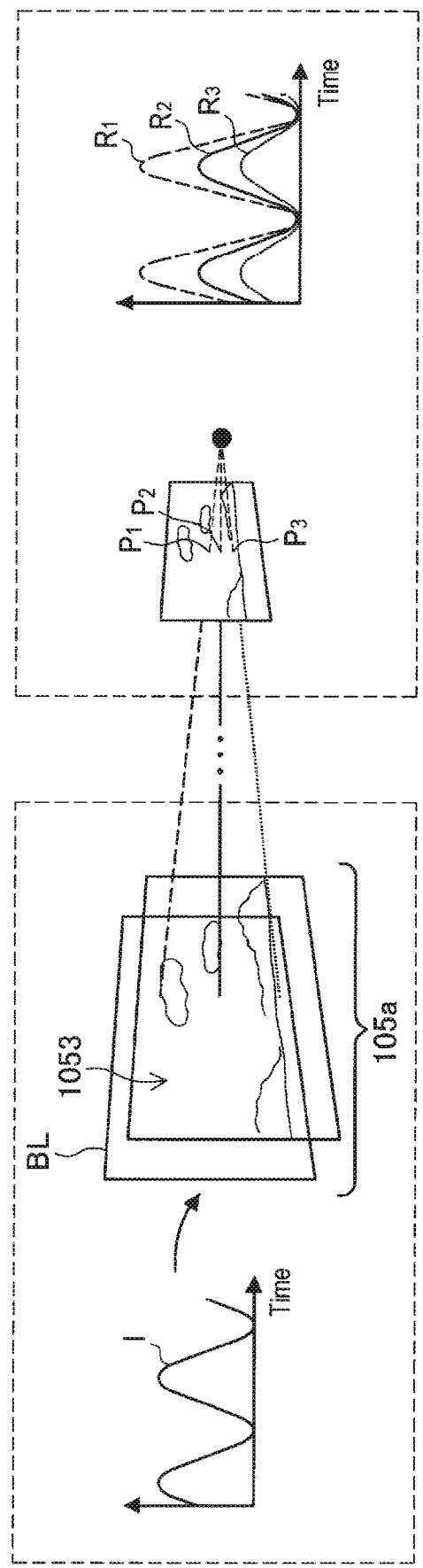
FIGS. 9(A) and 9(B) is a are diagrams for explaining modulation of image display light in the second embodiment of the present disclosure.
Figure 10:
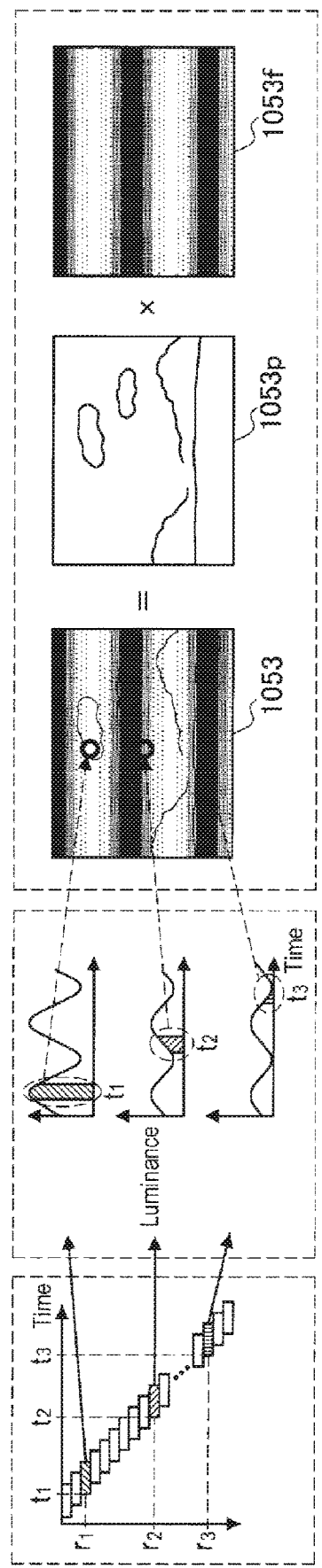
FIGS. 10(A), 10(B) and 10(C) is a are diagrams for explaining a first example of modulation component extraction in the second embodiment of the present disclosure.
Figure 11:
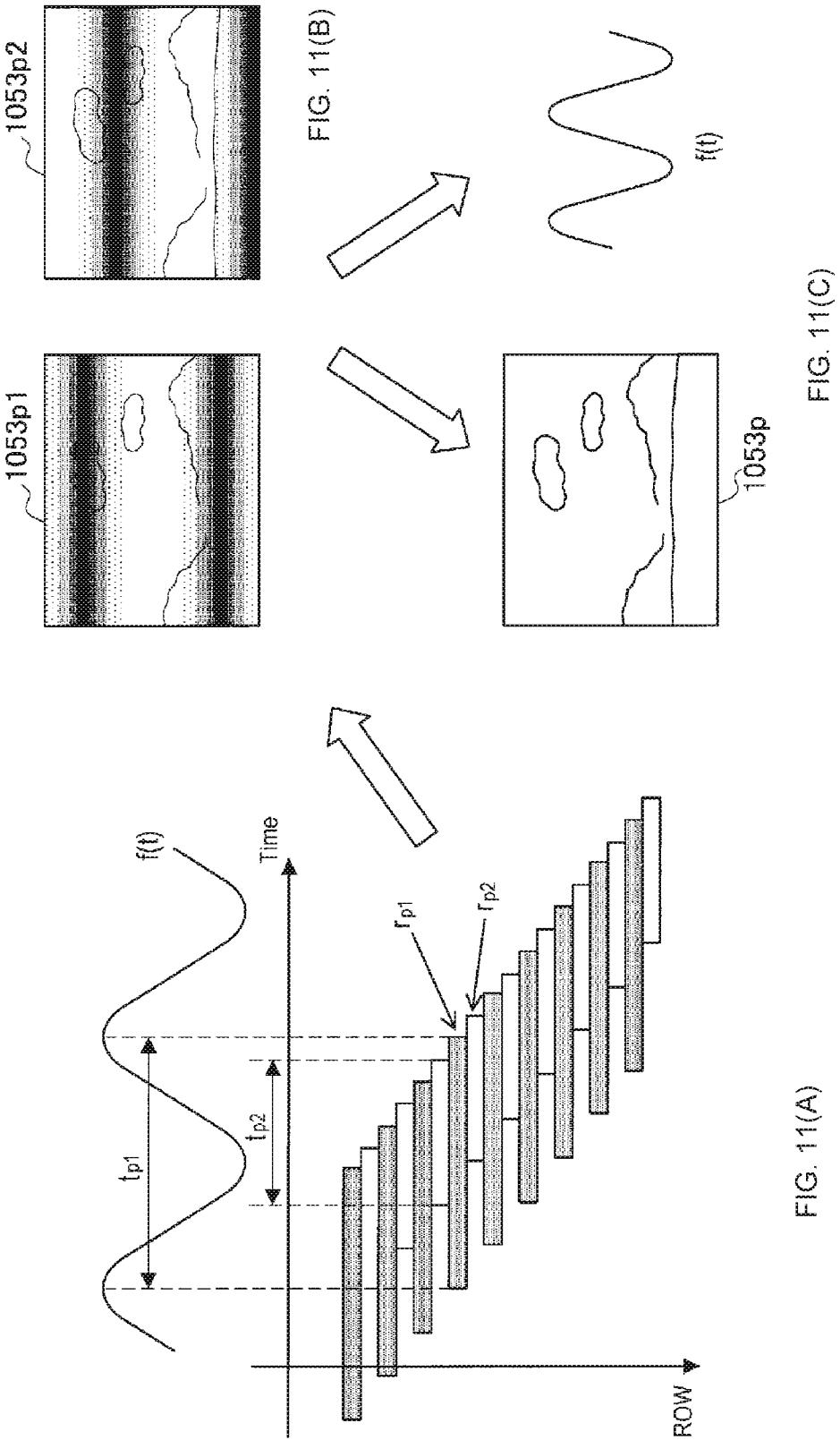
FIGS. 11(A), 11(B) and 11(C) is a are diagrams for explaining a second example of modulation component extraction in the second embodiment of the present disclosure.

FIG. 8 is a diagram for explaining a configuration regarding visible light communication in the second embodiment of the present disclosure. In the example shown in FIG. 8, when a video is distributed (S130), a coupon code (S130*a*) and a distributed video (S130*b*) are distributed to the video reception terminal 100*a*. The video reception terminal 100*a* executes backlight modulation signal generation processing 103 on the basis of the coupon code (S130*a*). The video reception terminal 100*a* further executes video decoding processing 107 on the basis of the distributed video (S130*b*). As a result, in display driving 109 in the video reception terminal 100*a*, a temporal modulation component of luminance added in the backlight modulation signal generation processing 103 is superimposed on a change in luminance for displaying the video decoded in the video decoding processing 107.

Meanwhile, in the coupon reception terminal 100*b*, when acquisition operation of a coupon (S142) is executed by the user U, an image sensor 111 acquires a taken image including the display 105*a* of the video reception terminal 100*a*. Coupon code separation processing 113 is executed with respect to the acquired taken image, and a coupon code (S150*a*) is extracted. Further, the taken image is subjected to camera signal processing 115, and therefore a captured image (S150*b*) of the video included in the taken image is extracted. The coupon code (S150a) and the captured image (S150b) are transmitted together with a coupon issuance request (S150) to the coupon issuance server 300.

Hereinafter, examples of the visible light communication in the present embodiment will be described with reference to FIGS. 9(A) and 9(B) to FIGS. 11(A), 11(B) and 11(C).

FIGS. 9(A) and 9(B) is a are diagrams for explaining modulation of image display light in the second embodiment of the present disclosure. FIGS. 9(A) and 9(B) show FIG. 9(A) temporally modulating luminance I of a backlight BL included in the display 105a when the video 1053 is displayed on the display 105a of the video reception terminal 100a and FIG. 9(B) a temporal change in luminance R1 to R3 at points P1 to P3 in the image 1053 observed on the coupon reception terminal 100b side.

In the present example, the video reception terminal 100a temporally modulates display light of the video 1053 in accordance with a coupon code in the backlight modulation signal generation processing 103 shown in FIG. 8. More specifically, the video reception terminal 100a controls a control signal generated by the display driving 109 so that the luminance I of the backlight BL is temporally modulated in accordance with the coupon code. Meanwhile, in the coupon code separation processing 113 shown in FIG. 8, the coupon reception terminal 100b detects a modulation signal from a temporal change in luminance R of the video 1053 included in the taken image and extracts a coupon code by demodulating the modulation signal.

Herein, modulation of light shown as the temporal change in luminance I can be implemented at a fluctuation velocity higher than a response speed of eyes of the user. Therefore, as a result of integration and equalization of the modulation component, the video 1053 visually recognized by the user is not substantially different from a case where modulation other than modulation of content of the video is not implemented.

Note that the coupon code is expressed by temporal modulation of luminance of the video 1053 in the above example. However, in another example, for example, the coupon code may be expressed by temporal modulation of chromaticity of the video 1053. More specifically, in a case where the backlight BL is made up of multicolor light emitting LEDs, modulation of light corresponding to the coupon code may be realized by temporally changing balance of light emission intensities of the LEDs having the respective colors.

FIGS. 10(A), 10(B) and 10(C) is a are diagrams for explaining a first example of modulation component extraction in the second embodiment of the present disclosure. FIGS. 10(A), 10(B) and 10(C) show FIG. 10(A) a shutter timing in each row obtained in a case where the image sensor 111 of the coupon reception terminal 100b employs a rolling shutter method of a CMOS or the like, FIG. 10(B) a spatial change in luminance value in each row caused by a difference in shutter timing between rows, and FIG. 10(C) a relationship between an image observed in a state in which the image has the spatial change in luminance value and an original image. In the present example, in the coupon code separation processing 113 in the coupon reception terminal 100b, a temporal modulation added to light for displaying an image of a virtual space is specified on the basis of a difference in luminance or chromaticity of light between a plurality of positions having different exposure timings in a taken image.

More specifically, as shown in FIG. 10(A), in the image sensor that employs the rolling shutter method, an exposure timing is slightly different in each row. As a result, as shown in FIG. 10(B), a phase of a luminance value of an image including a modulation component is different among an exposure time (time t1) of a row r1, an exposure time (time t2) of a row r2, and an exposure time (time t3) of a row r3 extracted as examples. As a result, as shown in FIG. 10(C), a spatial change in luminance appears in the video 1053 included in the taken image. It can be said that the video 1053 having such a luminance change (flicker) is a video in which a modulation component 1053f is superimposed on an original video 1053p (that does not include a modulation component) in the backlight modulation signal generation processing 103 in the video reception terminal 100a.

Therefore, when the original video 1053p in which the flicker is removed is obtained by some method (for example, overlapping images of a plurality of frames), it is possible to extract the modulation component 1053f on the basis of a difference between the video 1053 included in a certain frame of the taken image and the original video 1053p. The modulation component 1053f can be converted to, for example, a temporal change in luminance on the basis of a shutter speed of the image sensor. Alternatively, the modulation component 1053f may be treated as it is as a spatial modulation component.

FIGS. 11(A), 11(B) and 11(C) is a are diagrams for explaining a second example of modulation component extraction in the second embodiment of the present disclosure. FIGS. 11(A), 11(B) and 11(C) show FIG. 11(A) an exposure time in each row obtained in a case where the image sensor 111 of the coupon reception terminal 100b employs the rolling shutter method of a CMOS or the like, FIG. 11(B) two taken images of the same frame obtained by the image sensor 111, and FIG. 11(C) a relationship between the two taken images and a luminance change. Also in the present example, in the coupon code separation processing 113 in the coupon reception terminal 100b, a temporal modulation added to light for displaying an image of a virtual space is specified on the basis of a difference in luminance or chromaticity of light between a plurality of positions having different exposure timings in a taken image. However, a specific procedure thereof is different from the procedure in the above first example.

More specifically, as shown in FIG. 11(A), in the present example, the image sensor 111 employs the rolling shutter method, and, in addition, a length of the exposure time is different in each row or pixel. In the example shown in FIGS. 11(A), 11(B) and 11(C), rows rp1 exposed for a first exposure time tp1 and rows rp2 exposed for a second exposure time tp2 shorter than the first exposure time are alternately arrayed in the whole area of the image sensor. In the present example, as shown in FIG. 11(B), an image 1053p1 configured by pixels in the rows rp1 and an image 1053p2 configured by pixels in the rows rp2 are separately acquired. The length of the exposure time is different between the image 1053p1 and the image 1053p2, and therefore an integration section of a temporally modulated luminance value is different, and thus a luminance change occurring in an array direction of the rows is different.

Herein, relationships expressed as Expression 1 and Expression 2 shown below are satisfied where luminance of the original video 1053p is $i_{bg}(y)$, luminance of the image 1053p1 and luminance of the 1053p2 are $i_1(y)$ and $i_2(y)$, shutter functions (already known) are $s_1(t)$ and $s_2(t)$, and a temporal modulation component of the luminance is f(t).

[Math. 1]

$$i_1(y) = (s_1(t)*f(t)) \cdot i_{bg}(y) \qquad \text{(Expression 1)}$$

$$i_2(y)=(s_2(t)*f(t)) \cdot i_{bg}(y) \quad \text{(Expression 2)}$$

Furthermore, for example, in a case where the first exposure time $t_{p1}$ is an integer multiple of a period of the modulation component f(t), the modulation component f(t) is offset by integration in the image 1053p1. Therefore, Expression 3 shown below is satisfied regarding the luminance $i_1(y)$ of the image 1053p1 (k is an arbitrary integer). Furthermore, when Expression 3 is substituted for Expression 2 shown above, Expression 4 is satisfied.

[Math. 2]

$$i_1(y) = k \cdot i_{bg}(y) \quad \text{(Expression 3)}$$

$$\frac{i_2(y)}{i_1(y)} = (s_2(t)*f(t)) \cdot \frac{1}{k} \quad \text{(Expression 4)}$$

The shutter function $s_2(t)$ and k are already known, and therefore it is possible to obtain the modulation component f(t) by substituting $i_1(y)$ and $i_2(y)$ for Expression 4 shown above. In other words, in the present example, when the first exposure time $t_{p1}$ is caused to be an integer multiple of the period of the modulation component f(t), it is possible to extract the modulation component f(t) indicating a coupon code from the taken images of the single frame. More specifically, in Expression 4, the modulation component f(t) is calculated as a difference between the luminance $i_1(y)$ of the image 1053p1 that does not have a temporal change in luminance and the luminance $i_2(y)$ of the image 1053p2 that has a temporal change in luminance.

In the second embodiment of the present disclosure described above, a service includes provision of a video constituted of an image. The coupon reception terminal 100b acquires a taken image including a video while the service is being used. In other words, the coupon reception terminal 100b captures display light of the image constituting the video by taking an image. In the present embodiment, key information for coupon issuance is extracted from a temporal modulation component of the captured display light. The extracted key information can include, for example, a coupon code distributed together with the video by the video distribution server 200. In the example shown in FIG. 8, the video reception terminal 100a adds temporal modulation to luminance of the backlight in accordance with a coupon code, and therefore a temporal modulation component is added to display light of an image. A configuration in which the coupon issuance server 300 issues a coupon corresponding to a coupon code is similar to the configuration in the above first embodiment. Note that, also in the present embodiment, as well as in the first embodiment, a subject of a video included in a taken image may be detected and a coupon related to the subject may be issued. In this case, the user may select a desired position in the video (operation similar to the coupon acquisition operation in the first embodiment) when the user takes the video with the use of the coupon reception terminal 100b.

With the above configuration, for example, it is possible to realize issuance of a coupon using a coupon code even in a case where an apparatus to which a video is distributed and an apparatus that receives a coupon are separated. In other words, even in a case where a coupon code distributed together with a video as metadata cannot be transmitted from the user side (terminal device) to the coupon issuance server 300 unlike the first embodiment because the apparatus to which the video is distributed and the apparatus that receives a coupon are separated, the video reception terminal 100a can transmit the coupon code to the coupon reception terminal 100b by temporally modulating display light of an image constituting the video in accordance with the coupon code. As a modification example, the video distribution server 200 may distribute, to the video reception terminal 100a, a video in which luminance or the like is modulated in accordance with a coupon code in advance. In this case, the video reception terminal 100a does not need to have a function of temporally modulating display light of an image. The present embodiment is similar to the above first embodiment in that detailed control related to an issuance period of a coupon or the like can be performed by using a coupon code.

3. Third Embodiment

Figure 12:
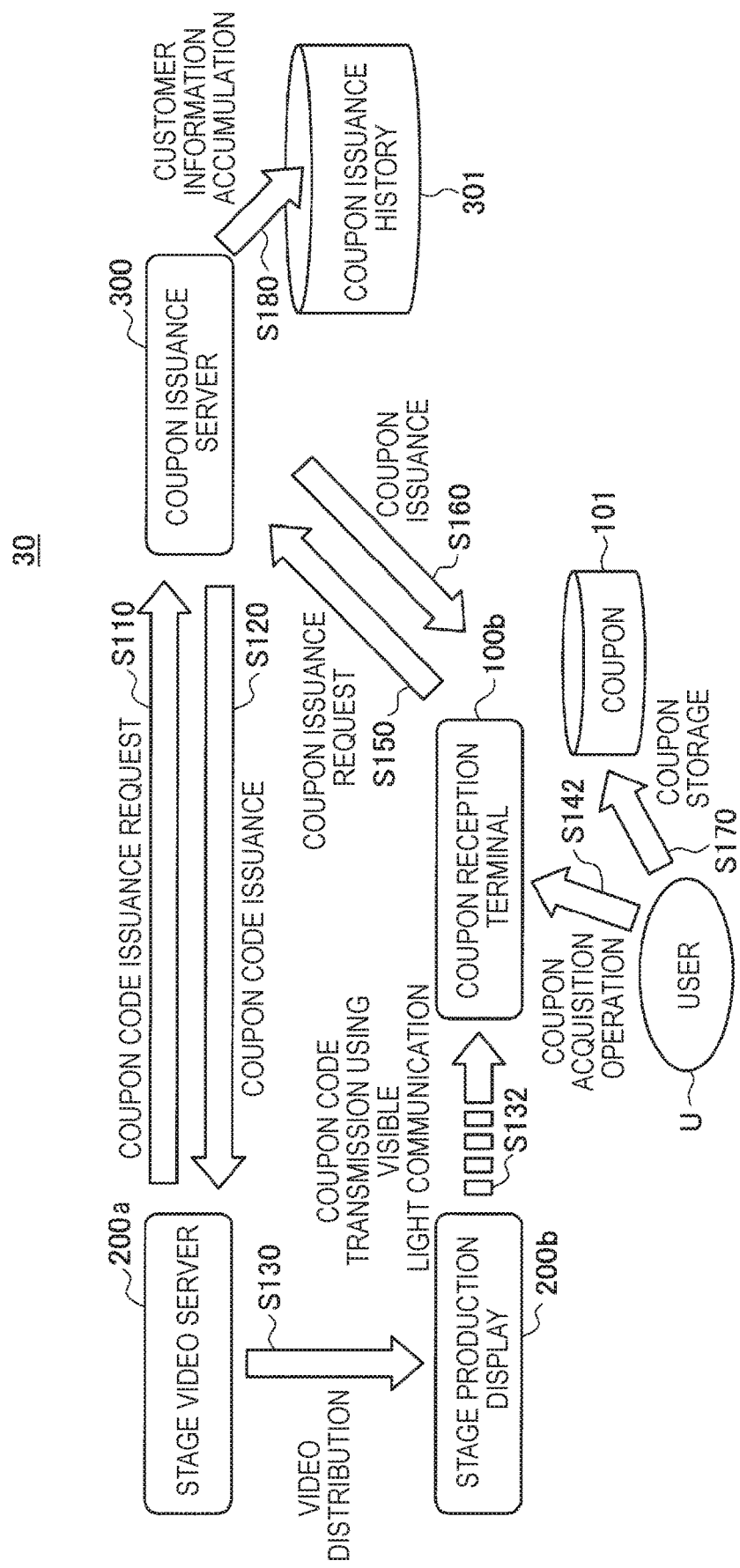
FIG. 12 is a diagram showing a system according to a third embodiment of the present disclosure.

FIG. 12 is a diagram showing a system according to a third embodiment of the present disclosure. When referring to FIG. 12, a system 30 includes the coupon reception terminal 100b, a stage video server 200a, a stage production display 200b, and the coupon issuance server 300. The stage production display 200b is a large display used for showing a video as a background of a stage performance as described below. The stage video server 200a is a server for controlling the stage production display 200b and may be integrally provided with the stage production display 200b. Both the stage video server 200a and the stage production display 200b can be realized by, for example, the hardware configuration of the information processing apparatus described below.

In the present embodiment, a service including provision of a stage performance is provided. Provision of a background video shown by the stage production display 200b is also included in the service. Hereinafter, the present embodiment will be further described with reference to operation of each apparatus in the system 30. Note that the configurations of the coupon reception terminal 100b and the coupon issuance server 300 are similar to the configurations thereof in the above second embodiment, and therefore repeated description is omitted.

When referring to FIG. 12, in the system 30, the coupon issuance server 300 issues a coupon code in response to a request (S110) of the stage video server 200a (S120), and a video is distributed from the stage video server 200a to the stage production display 200b (S130). The coupon code is expressed by a temporal modulation component of display light of an image as in the second embodiment. The stage production display 200b that displays the distributed video transmits the coupon code to the coupon reception terminal 100b via visible light communication (S132). Note that, as a visible light communication method, a method similar to the method in the second embodiment is usable.

The user U executes acquisition operation of a coupon with the use of the coupon reception terminal 100b while viewing a stage performance in which a video shown by the stage production display 200b is used as a background (S142). In the present embodiment, the acquisition operation of the coupon includes taking an image of a state of the stage performance including the video shown by the stage production display 200b with the use of the camera of the coupon reception terminal 100b. An example of such operation will be described with reference to FIG. 13.

Figure 13:
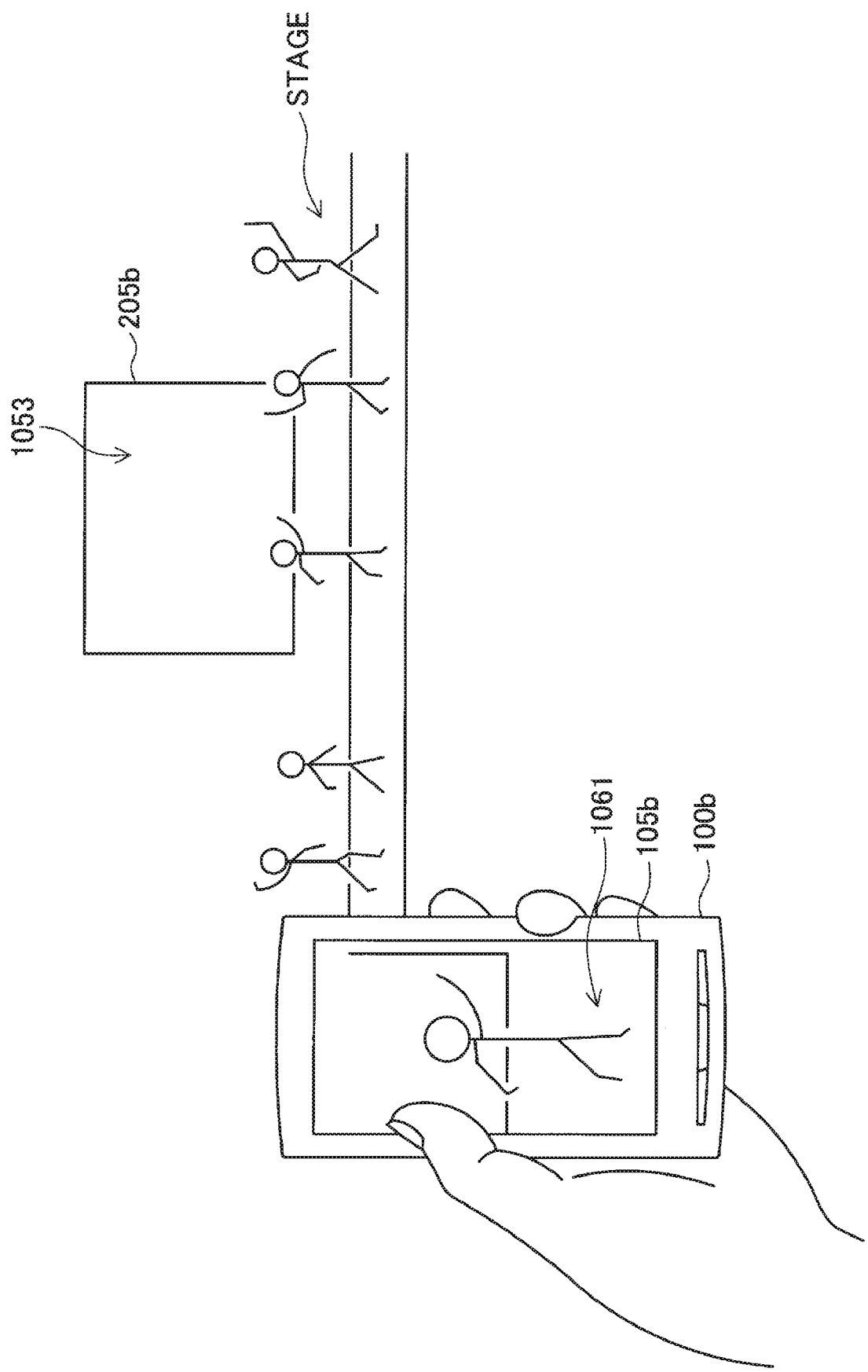
FIG. 13 is a diagram for explaining acquisition operation of a coupon in the third embodiment of the present disclosure.

FIG. 13 is a diagram for explaining acquisition operation of a coupon in the third embodiment of the present disclosure. In the example shown in FIG. 13, a video 1053 is displayed on a display 205b included in the stage production display 200b. The user takes an image of the stage performance in which the display 205b on which the video 1053 is displayed is used as a background with the use of the camera of the coupon reception terminal 100b. In FIG. 13, a taken image 1061 is displayed on the display 105b of the coupon reception terminal 100b. With this operation, the coupon reception terminal 100b captures display light of an image constituting the video 1053. As in the second embodiment, the display light captured herein includes a temporal modulation component. Also in the present embodiment, a coupon code serving as key information for coupon issuance is extracted from temporal modulation of such display light.

When referring to FIG. 12 again, in a case where the acquisition operation of the coupon (S142) is executed, the coupon reception terminal 100b transmits a coupon issuance request to the coupon issuance server 300 (S150). The coupon issuance request includes the coupon code extracted by demodulating the temporal modulation component included in the display light of the video 1053 captured in the coupon acquisition operation (S142). The coupon issuance request may further include data of the taken image acquired in the coupon acquisition operation (S142). In this case, the data of the taken image can include an image of a performer in the stage performance in addition to the video 1053. The coupon issuance server 300 that has received the coupon issuance request (S150) issues a coupon corresponding to the coupon code (S160). At this time, the coupon issuance server 300 may detect the performer included in the taken image as a subject and issue a coupon related to the performer. The coupon issuance server 300 transmits coupon information indicating the issued coupon to the coupon reception terminal 100b, and the coupon reception terminal 100b stores the coupon 101 (S170). Further, the coupon issuance server 300 accumulates information on the user U in the coupon issuance history 301 (S180).

In the third embodiment of the present disclosure as described above, a service includes provision of a stage performance. The service further includes provision of a video (constituted of an image) displayed as a background of the stage performance. The coupon reception terminal 100b acquires a taken image of the stage performance including the video of the background while the service is being used. In other words, the coupon reception terminal 100b captures display light of the image constituting the video of the background by taking an image. A configuration for extracting key information and issuing a coupon corresponding to the coupon code thereafter is similar to the configuration in the above second embodiment. However, in the present embodiment, when the coupon reception terminal 100b captures the display light of the image, the coupon reception terminal 100b can also capture an image of a performer in the stage performance at the same time. By detecting the performer from this image, the coupon issuance server 300 can issue a coupon related to each performer in a similar way to the way to issue a coupon related to a subject in the first embodiment.

With the above configuration, for example, it is possible to realize issuance of a coupon using a coupon code even in the case where an apparatus to which a video is distributed and an apparatus that receives a coupon are separated and the apparatus to which the video is distributed is not possessed by the user. Further, it can be said that the present embodiment also shows that, in a case where, even when a main part of a service is not necessarily distribution of a video, the video can be provided to the user by some method and a taken image including the video can be acquired, it is possible to realize the above issuance of a coupon using a coupon code. In this case, it is also possible to issue a coupon related to an element that does not included in the video but is included in the service by detecting an object (performer in the example of the present embodiment) captured together with the video in the taken image.

4. Fourth Embodiment

Figure 14:
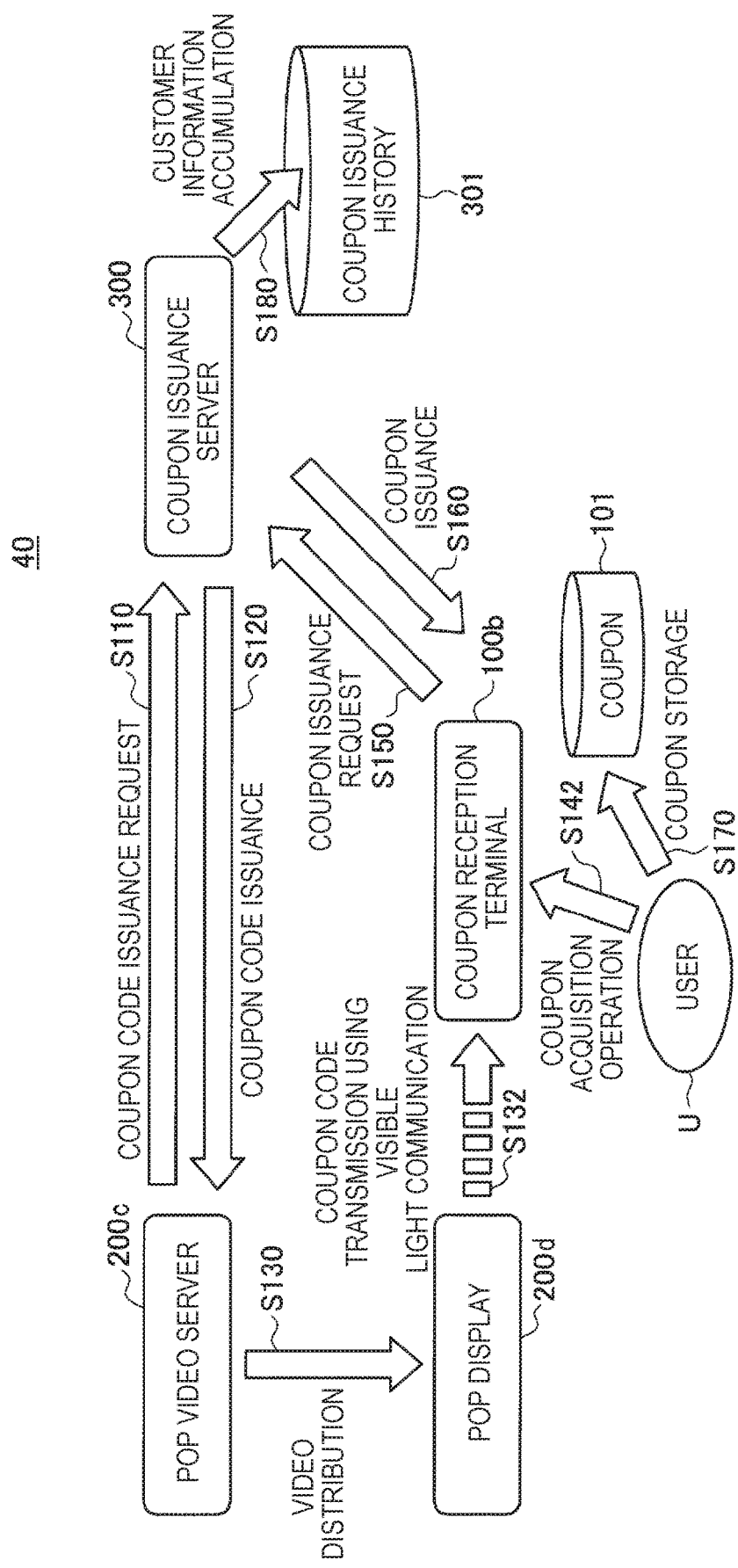
FIG. 14 is a diagram showing a system according to a fourth embodiment of the present disclosure.

FIG. 14 is a diagram showing a system according to a fourth embodiment of the present disclosure. When referring to FIG. 14, a system 40 includes the coupon reception terminal 100b, a POP video server 200c, a POP display 200d, and the coupon issuance server 300. The POP display 200d is a display for displaying a point of purchase (POP) advertisement as described below. The POP advertisement is, for example, an advertisement posted in a store to which a commercial product is provided. In recent years, displaying such a POP advertisement on a display has also been generally performed. The POP video server 200c is a server for controlling the POP display 200d and may be integrally provided with the POP display 200d. Both the POP video server 200c and the POP display 200d can be realized by, for example, the hardware configuration of the information processing apparatus described below.

In the present embodiment, a service includes provision of a commercial product. A POP advertisement related to the provided commercial product is displayed on the POP display 200d. Note that a place where the commercial product is provided may be anywhere as long as the POP display 200d can be placed. Hereinafter, the present embodiment will be further described with reference to operation of the system 40. Note that the configurations of the coupon reception terminal 100b and the coupon issuance server 300 are similar to the configurations in the above second embodiment, and therefore repeated description is omitted.

When referring to FIG. 14, in the system 40, the coupon issuance server 300 issues a coupon code in response to a request (S110) of the POP video server 200c (S120), and a video is distributed from the POP video server 200c to the POP display 200d (S130). The coupon code is expressed by a temporal modulation component of display light of an image as in the second embodiment. The POP display 200d that displays the distributed video transmits the coupon code to the coupon reception terminal 100b via visible light communication (S132). Note that, as a visible light communication method, a method similar to the method in the second embodiment is usable.

The user U views a video of a POP advertisement displayed on the POP display 200d while shopping in a store. At this time, the user U executes acquisition operation of a coupon with the use of the coupon reception terminal 100b as necessary (S142). In the present embodiment, the acquisition operation of the coupon includes taking an image of a POP video displayed by the POP display 200d with the use of the camera of the coupon reception terminal 100b. An example of such operation is shown in FIG. 15.

Figure 15:
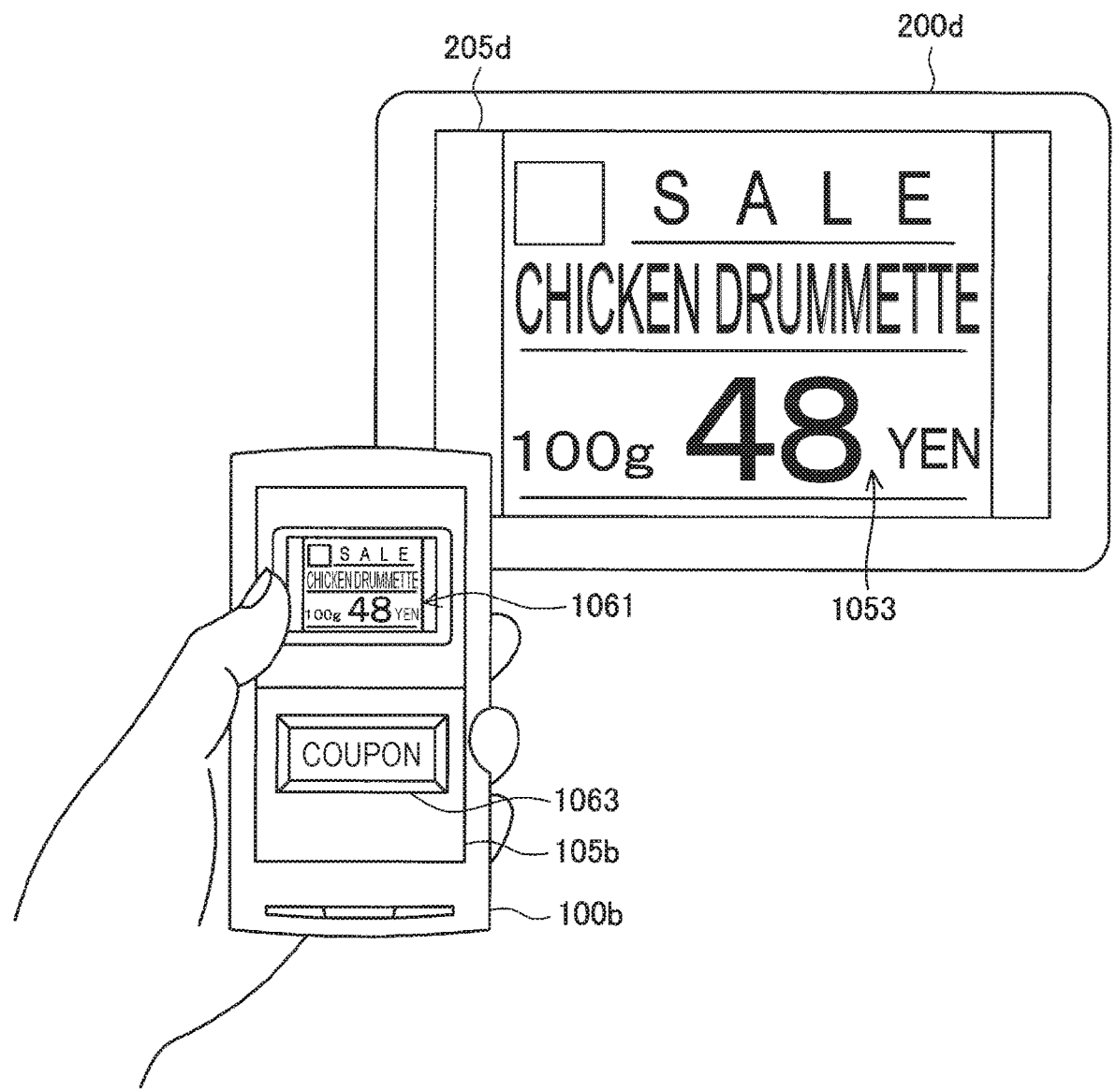
FIG. 15 is a diagram for explaining acquisition operation of a coupon in the fourth embodiment of the present disclosure.

FIG. 15 is a diagram for explaining acquisition operation of a coupon in the fourth embodiment of the present disclosure. In the example shown in FIG. 15, a video 1053 of a POP advertisement is displayed on a display 205d included in the POP display 200d. The user takes an image of the display 205d on which the video 1053 is displayed with the use of the camera of the coupon reception terminal 100b. In FIG. 15, a taken image 1061 is displayed on the display 105b of the coupon reception terminal 100b. With this operation, the coupon reception terminal 100b captures display light of an image constituting the video 1053. As in the second embodiment, the display light captured herein includes a temporal modulation component. Also in the present embodiment, a coupon code serving as key information for coupon issuance is extracted from temporal modulation of such display light. Furthermore, as shown in FIG. 15, an image 1063 of a coupon issued by the coupon issuance server 300 through processing described below may be displayed on the display 105b in real time.

When referring to FIG. 14 again, in a case where the acquisition operation of the coupon (S142) is executed, the coupon reception terminal 100b transmits a coupon issuance request to the coupon issuance server 300 (S150). The coupon issuance request includes the coupon code extracted by demodulating the temporal modulation component included in the display light of the video 1053 captured in the coupon acquisition operation (S142). The coupon issuance request may further include information indicating spatial modulation of display light of a captured POP advertisement video (for example, data of taken image). The coupon issuance server 300 that has received the coupon issuance request (S150) issues a coupon corresponding to the coupon code (S160). At this time, the coupon issuance server 300 may recognize a text included in the captured POP advertisement video and issue a coupon related to the text. The coupon issuance server 300 transmits coupon information indicating the issued coupon to the coupon reception terminal 100b, and the coupon reception terminal 100b stores the coupon 101 (S170). Further, the coupon issuance server 300 accumulates information on the user U in the coupon issuance history 301 (S180).

In the fourth embodiment of the present disclosure as described above, a service includes provision of a commercial product. The coupon reception terminal 100b captures display light of an information image (image constituting a POP advertisement video) related to the commercial product in accordance with user operation while the service is being used, more specifically, shopping is performed. A configuration for extracting key information and issuing a coupon corresponding to the coupon code thereafter is similar to the configuration in the above second embodiment. Note that, in a case where, for example, the POP displays 200d are placed for a plurality of commercial products in the store, display light of an image may be modulated in accordance with a coupon code different for each commercial product in each POP display 200d, or display light of an image may be modulated in accordance with a common coupon code in all the POP displays 200d and light of a coupon corresponding to each commercial product may be selectively emitted by recognizing text included in the POP advertisement video.

With the above configuration, for example, it is possible to provide a coupon without influencing appearance of a POP advertisement video. For example, in a case where a program for extracting a coupon code from a temporal modulation component of an image constituting a POP advertisement video is provided only to limited customers such as registered members, a coupon is limitedly issued to those members but such issuance of the coupon is not found from the POP advertisement video itself, and therefore it is possible not to give an unpleasant feeling to other customers. The present embodiment is similar to the above first embodiment in that detailed control related to an issuance period of a coupon or the like can be performed by using a coupon code. However, in a case where, for example, a coupon regarding a commercial product provided in a store is issued, it is possible to switch presence/absence of a discount or a discount rate in real time. Therefore, it is possible to promptly implement start of a discount, an increase in a discount rate, or the like in accordance with, for example, the number of unsold products.

5. Fifth Embodiment

Figure 16:
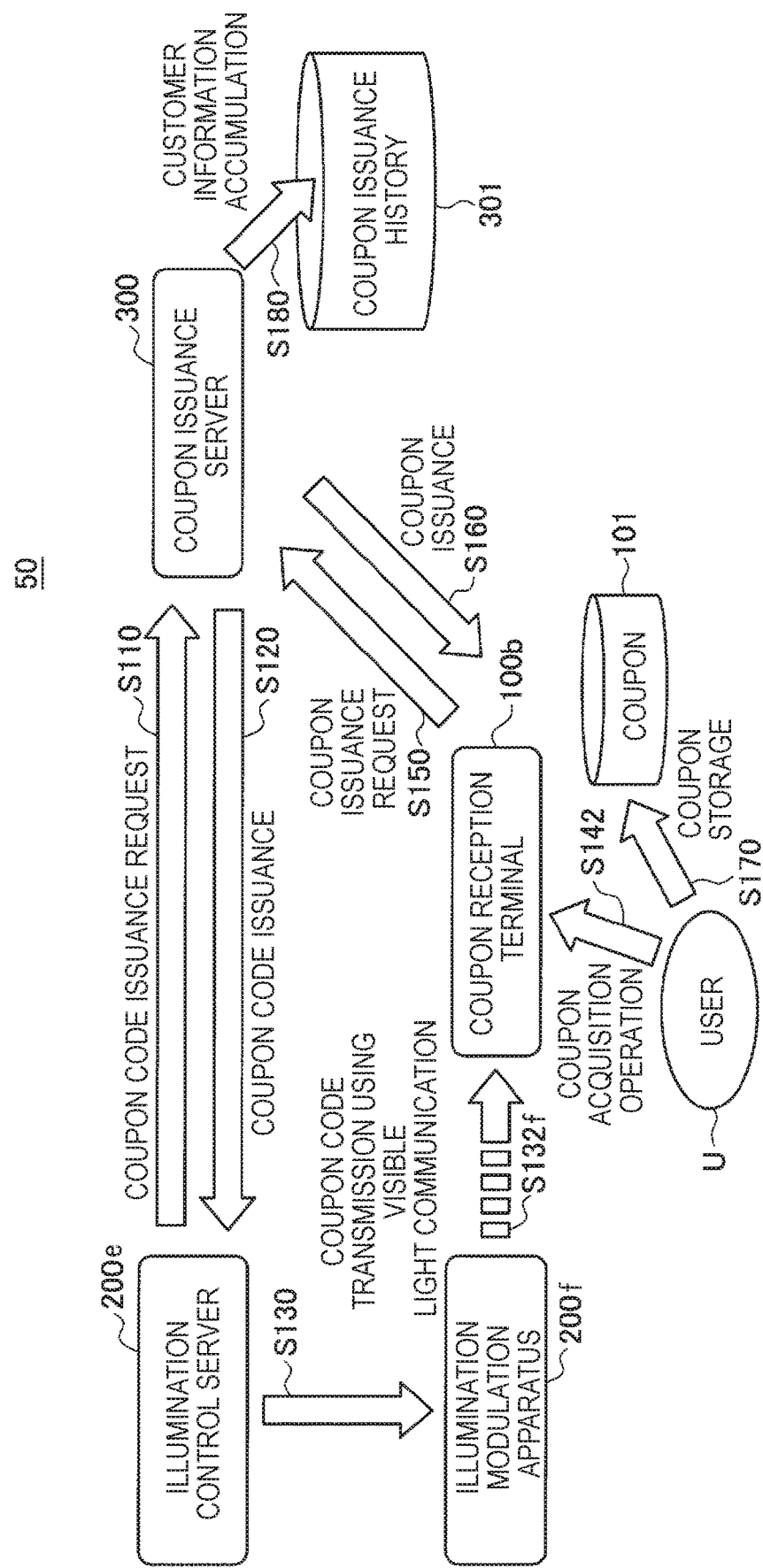
FIG. 16 is a diagram showing a system according to a fifth embodiment of the present disclosure.

FIG. 16 is a diagram showing a system according to a fifth embodiment of the present disclosure. When referring to FIG. 16, a system 50 includes the coupon reception terminal 100b, an illumination control server 200e, an illumination modulation apparatus 200f, and the coupon issuance server 300. The illumination modulation apparatus 200f is an apparatus for controlling illumination light in a space of a store as described below. The illumination control server 200e is a server for controlling a state of lighting in the space of the store via the illumination modulation apparatus 200f and may be integrally provided with the illumination modulation apparatus 200f. Both the illumination control server 200e and the illumination modulation apparatus 200f can be realized by, for example, the hardware configuration of the information processing apparatus described below.

In the present embodiment, a service includes provision of a commercial product in the space of the store. The illumination modulation apparatus 200f controls illumination light generated by the lighting placed in the space of the store in which commercial products are displayed. More specifically, the illumination modulation apparatus 200f adds a temporal modulation component to, for example, illuminance or chromaticity of the illumination light. The commercial products in the space of the store are visually recognized by the user U via reflected light of this illumination light and are recorded as a taken image. Hereinafter, the present embodiment will be further described with reference to operation of the system 50. Note that the configurations of the coupon reception terminal 100b and the coupon issuance server 300 are similar to the configurations in the above second embodiment, and therefore repeated description is omitted.

When referring to FIG. 16, in the system 50, the coupon issuance server 300 issues a coupon code in response to a request (S110) of the illumination control server 200e (S120), and a modulation pattern of illumination light is transmitted from the illumination control server 200e to the illumination modulation apparatus 200f (S130e). Herein, the coupon code is expressed by a temporal modulation component of the illumination light. The illumination modulation apparatus 200f controls the illumination light in accordance with the transmitted modulation pattern. A commercial product in a space of a store reflects the illumination light, and the coupon reception terminal 100b takes an image formed by using the reflected light, and therefore transmission of the coupon code via visible light communication is realized (S132f). In the present embodiment, temporal modulation is added to illuminance or chromaticity of the illumination light, instead of the luminance of the backlight. Also in this case, the coupon reception terminal 100b can extract a temporal modulation component of light included in the taken image in the same way as, for example, the second embodiment because the present embodiment is similar to the second embodiment in that a temporal change in luminance or the like occurs in the taken image recorded by using the reflected light.

The user U executes acquisition operation of a coupon with the use of the coupon reception terminal 100b with respect to a desired commercial product while shopping in the store (S142). In the present embodiment, the acquisition operation of the coupon includes taking an image of a commercial product reflecting illumination light controlled by the illumination modulation apparatus 200f with the use of the camera of the coupon reception terminal 100b. An example of such operation is shown in FIG. 17.

Figure 17:
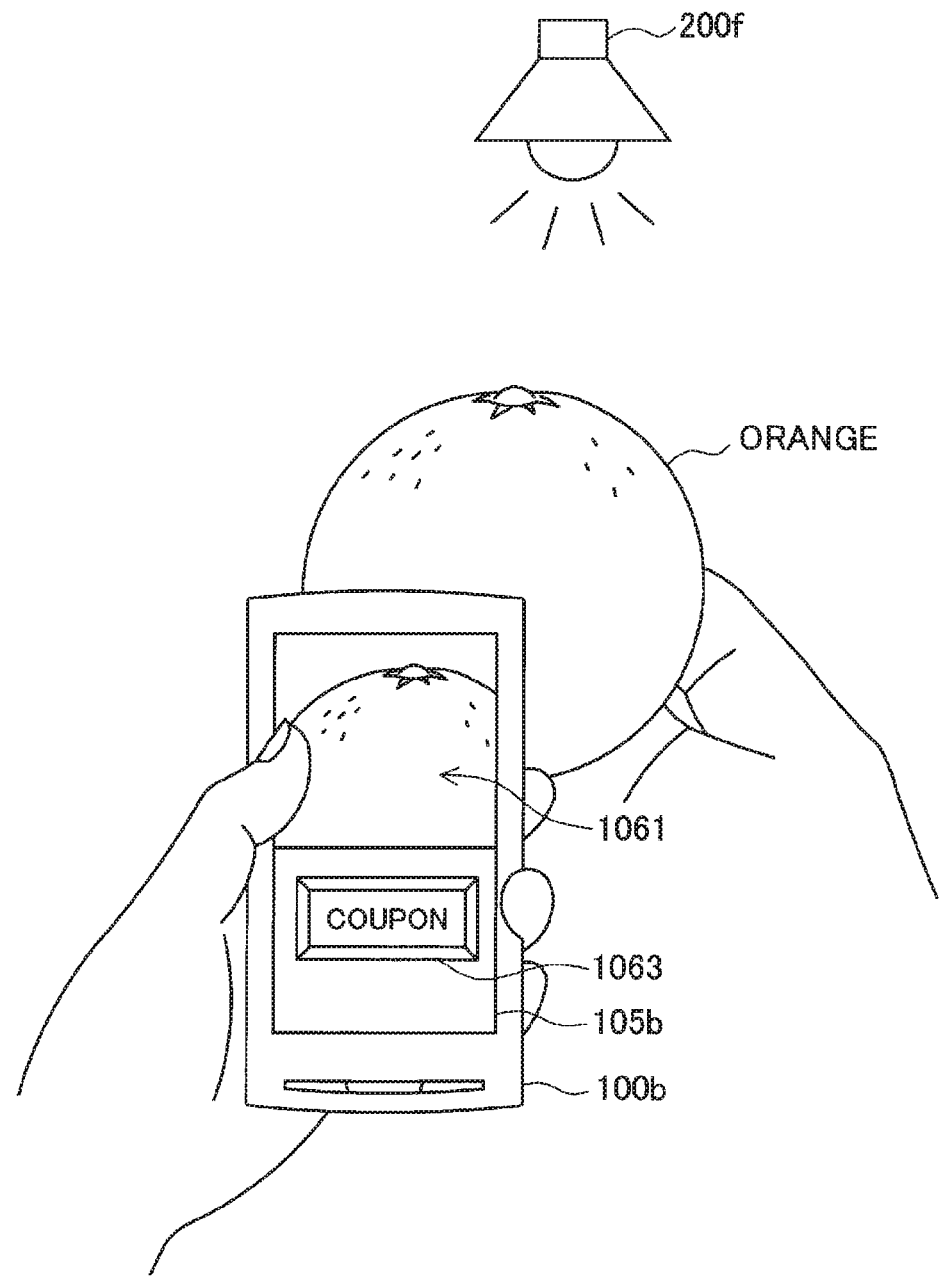
FIG. 17 is a diagram for explaining acquisition operation of a coupon in the fifth embodiment of the present disclosure.

FIG. 17 is a diagram for explaining acquisition operation of a coupon in the fifth embodiment of the present disclosure. In the example shown in FIG. 17, the user takes an image of a commercial product (orange) illuminated with the lighting controlled by the illumination modulation apparatus 200f with the use of the camera of the coupon reception terminal 100b. In FIG. 17, a taken image 1061 is displayed on the display 105b of the coupon reception terminal 100b. At this time, the orange reflects illumination light in which an temporal modulation component is added by the illumination modulation apparatus 200f. The coupon reception terminal 100b takes an image of the orange and therefore captures reflected light obtained by reflecting the illumination light in which the modulation component is added. A temporal modulation component similar to the temporal modulation component in the illumination light is generated in the reflected light. Therefore, also in the present embodiment, it is possible to extract a coupon code serving as key information for coupon issuance from temporal modulation of the light included in the taken image. Furthermore, as shown in FIG. 17, an image 1063 of a coupon issued by the coupon issuance server 300 through processing described below may be displayed on the display 105b in real time.

When referring to FIG. 16 again, in a case where the acquisition operation of the coupon (S142) is executed, the coupon reception terminal 100b transmits a coupon issuance request to the coupon issuance server 300 (S150). The coupon issuance request includes the coupon code extracted by demodulating the temporal modulation component included in the reflected light captured in the coupon acquisition operation (S142). The coupon issuance request may further include data of the taken image acquired in the coupon acquisition operation (S142). In this case, the data of the taken image can also include an image of a commercial product (orange in the example of FIG. 17) serving as a subject. The coupon issuance server 300 that has received the coupon issuance request issues a coupon corresponding to the coupon code (S160). At this time, the coupon issuance server 300 may detect the commercial product included in the taken image as a subject and issue a coupon related to the commercial product. The coupon issuance server 300 transmits coupon information indicating the issued coupon to the coupon reception terminal 100b, and the coupon reception terminal 100b stores the coupon 101 (S170). Further, the coupon issuance server 300 accumulates information on the user U in the coupon issuance history 301 (S180).

Figure 18:
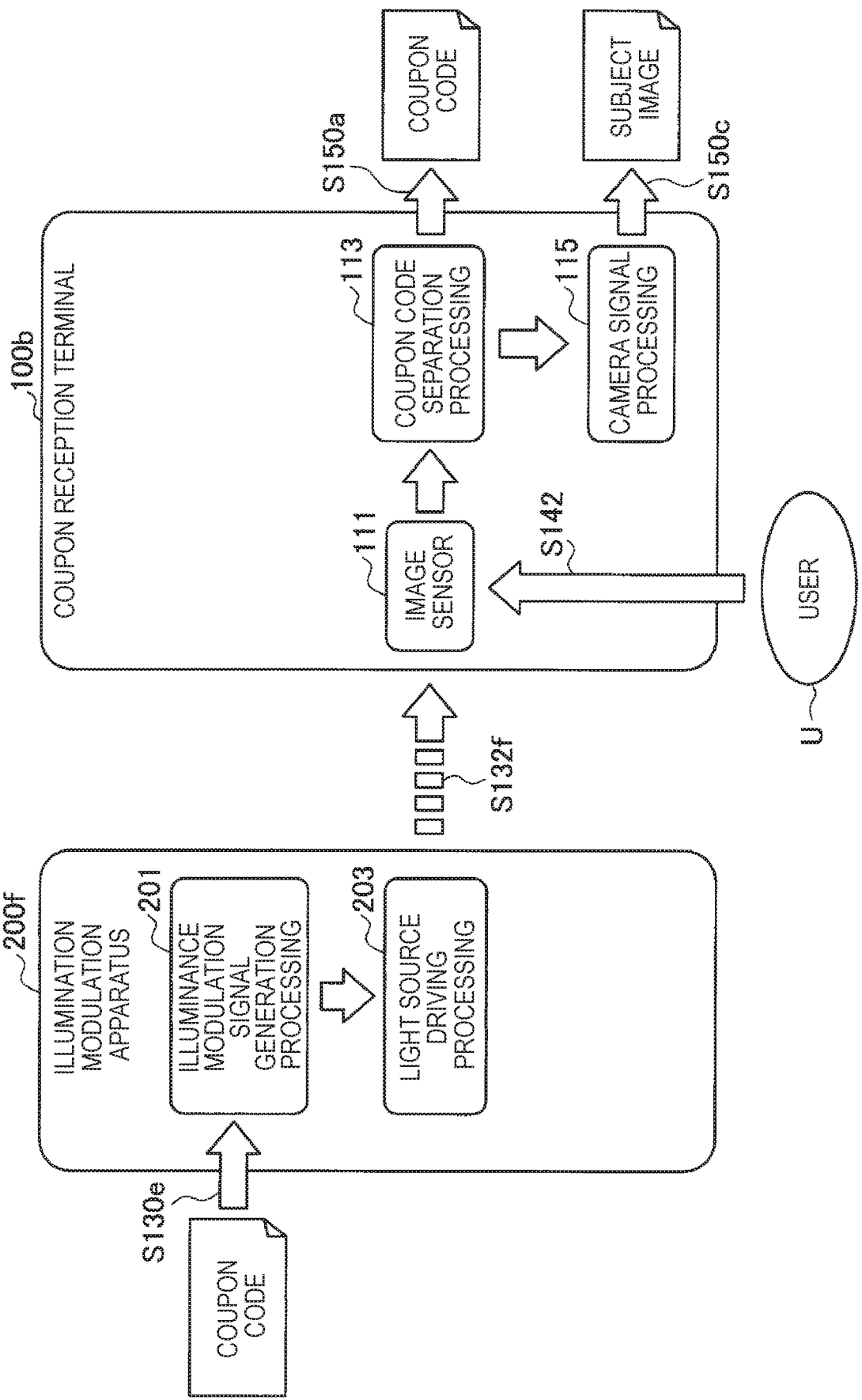
FIG. 18 is a diagram for explaining a configuration regarding visible light communication in the fifth embodiment of the present disclosure.

FIG. 18 is a diagram for explaining a configuration regarding visible light communication in the fifth embodiment of the present disclosure. In the example shown in FIG. 18, a modulation pattern of illumination light based on a coupon code is transmitted to the illumination modulation apparatus 200f from the illumination control server 200e (S130e). The illumination modulation apparatus 200f executes illuminance modulation signal generation processing 201 in accordance with this modulation pattern. In light source driving 203 in the illumination modulation apparatus 200f, a temporal modulation component of illuminance added in the illuminance modulation signal generation processing 201 is included.

Meanwhile, in the coupon reception terminal 100b, when reception operation (S142) of the coupon is executed by the user U, the image sensor 111 acquires a taken image including a commercial product reflecting the illumination light controlled by the illumination modulation apparatus 200f. The coupon code separation processing 113 is executed with respect to the acquired taken image, and a coupon code (150a) is extracted. Herein, although the present embodiment is different from the second embodiment in that what is included in the taken image is display light of an image or reflected light of lighting, the coupon code separation processing 113 can be executed in the same way as the second embodiment. Further, an image (150b) of a subject included in the taken image is extracted by performing the camera signal processing 115 on the taken image. The coupon code (S150a) and a subject image (150c) are transmitted together with the coupon issuance request (S150) to the coupon issuance server 300.

In the fifth embodiment of the present disclosure as described above, a service includes provision of a commercial product in a space of a store in which lighting is placed. The coupon reception terminal 100b takes an image of the commercial product in accordance with user operation while the service is being used, more specifically, shopping is performed. With this, reflected light obtained by causing illumination light generated by the lighting in the space of the store to be reflected by the commercial product is captured. Herein, the illumination light is temporally modulated in accordance with a coupon code. Therefore, the reflected light to be captured is also temporally modulated in accordance with the coupon code. Thus, it is possible to extract key information for coupon issuance from a temporal modulation component of the light captured as the taken image as in the above embodiments. The coupon issuance server 300 may issue a coupon common to commercial products corresponding to the coupon code or may detect a commercial product included in the taken image as a subject and issue a coupon related to the commercial product. Note that detection of the commercial product included as a subject may be implemented in the coupon reception terminal 100b.

With the above configuration, for example, it is possible to realize issuance of a coupon using a coupon code in a service for providing a commercial product even in a case where an apparatus such as the POP display in the above fourth embodiment is not placed. Therefore, in the present embodiment, it is possible to set a coupon regarding an arbitrary commercial product without considering arrangement of the POP display or the like. Further, the present embodiment is similar to the above fourth embodiment in that a coupon is issued to limited customers but it is possible not to give an unpleasant feeling to other customers and it is possible to promptly implement start of a discount, an increase in a discount rate, or the like in accordance with the number of unsold products.

6. Sixth Embodiment

Figure 19:
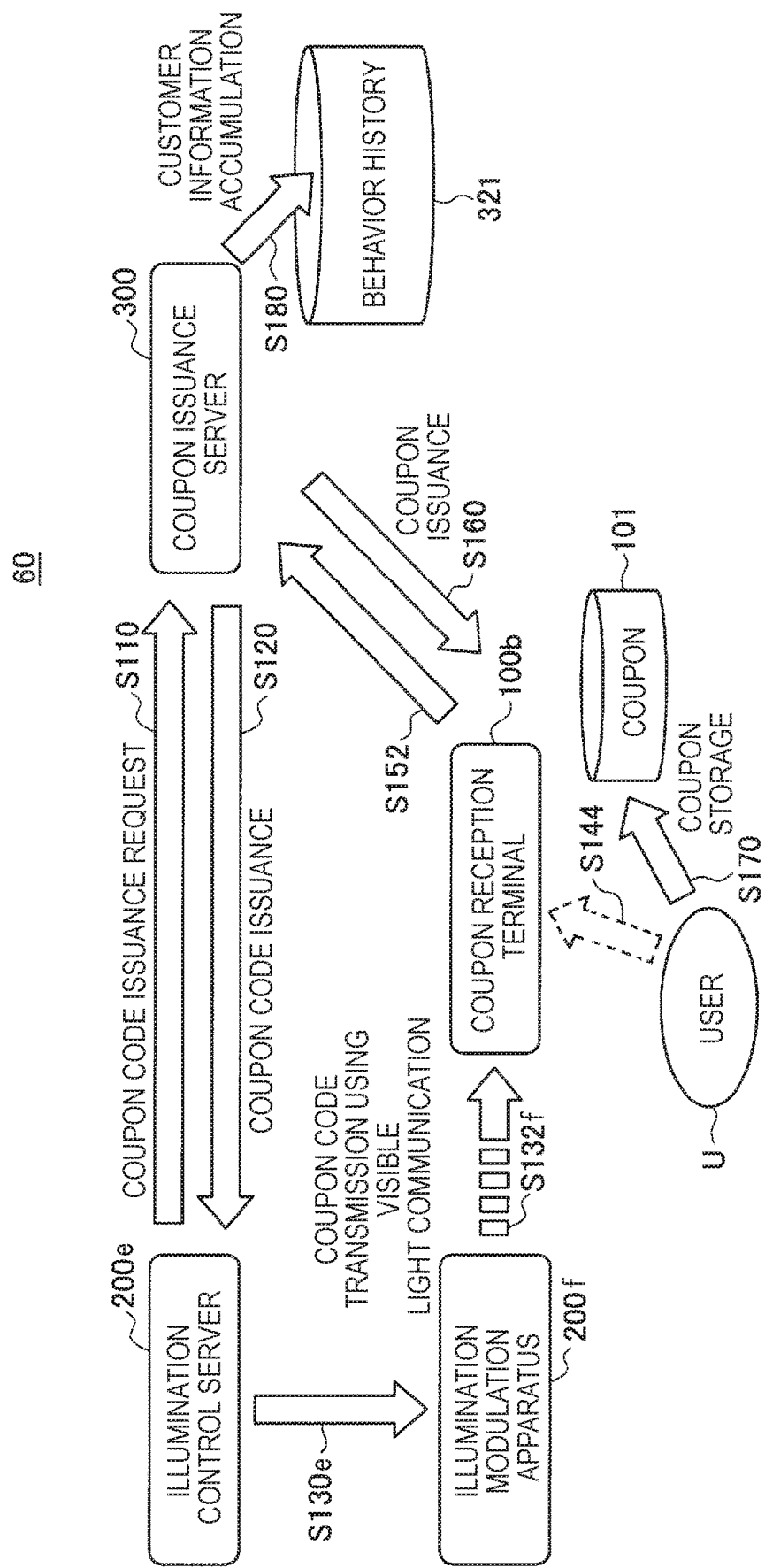
FIG. 19 is a diagram showing a system according to a sixth embodiment of the present disclosure.

FIG. 19 is a diagram showing a system according to a sixth embodiment of the present disclosure. When referring to FIG. 19, a system 60 includes the coupon reception terminal 100b, the illumination control server 200e, the illumination modulation apparatus 200f, and the coupon issuance server 300. Note that a system configuration of the present embodiment is similar to the system configuration in the above fifth embodiment.

In the present embodiment, a service is provided in a space in which lighting is placed. The coupon reception terminal 100b captures illumination light itself generated by this lighting (or reflected light obtained by causing the illumination light to be reflected by an unspecified object in the space). Therefore, in the present embodiment, what is provided by the service may be anything as long as that is provided in the space in which the lighting is placed, and, for example, staying in the space may be a service. In other words, an object (commercial product) that can reflect illumination light does not need to be provided by the service, which is different from the above fifth embodiment. Hereinafter, the present embodiment will be further described with reference to operation of the system 60.

When referring to FIG. 19, in the system 60, the coupon issuance server 300 issues a coupon code in response to a request (S110) of the illumination control server 200*e* (S120), and a modulation pattern of illumination light is transmitted from the illumination control server 200*e* to the illumination modulation apparatus 200*f* (S130*e*). Herein, the coupon code is expressed by a temporal modulation component of the illumination light. The illumination modulation apparatus 200*f* controls the illumination light in accordance with the transmitted modulation pattern. The illumination light in the space in which the service is provided (or reflected light obtained by causing the illumination light to be reflected by an unspecified object in the space) is captured by the coupon reception terminal 100*b*, and thus transmission of the coupon code via visible light communication is realized (S132*f*). In the present embodiment, what is captured is not limited to the reflected light obtained by reflecting the illumination light and can also include the illumination light itself. Also in this case, the coupon reception terminal 100*b* can extract a temporal modulation component of the captured light in the same way as, for example, the second embodiment and the fifth embodiment because the present embodiment is similar to those embodiments in that a temporal change in illuminance or the like occurs in the captured light.

In the present embodiment, the user U does not necessarily need to execute explicit coupon acquisition operation while using the service (S144). For example, the user U uses the service by carrying the coupon reception terminal 100*b* in a state in which the camera of the coupon reception terminal 100*b* can capture light on the periphery thereof. For example, in a case where the service includes provision of a commercial product in a space of a store, the user continues shopping in a state in which the coupon reception terminal 100*b* is attached to a holder of a shopping cart. Alternatively, in a case where the coupon reception terminal 100*b* is a wearable terminal such as an eyewear, the user U activates the camera of the coupon reception terminal 100*b* and continues shopping. During this time, the camera of the coupon reception terminal 100*b* continuously takes an image of the periphery of the user U. A temporal modulation component of illumination light generated by the illumination modulation apparatus 200*f* is captured in the taken image as long as the user U stays in the space in which the service is provided.

The coupon reception terminal 100*b* continuously transmits, to the coupon issuance server 300, a coupon code extracted by demodulating the temporal modulation component included in the captured light during the above behavior of the user U, i.e., while the user U stays in the space in which the service is provided in a state in which the coupon reception terminal 100*b* can capture light (S152). In a case where the coupon code is continuously received for a predetermined time or more, the coupon issuance server 300 issues a coupon corresponding to the coupon code (S160). The coupon issuance server 300 transmits coupon information indicating the issued coupon to the coupon reception terminal 100*b*, and the coupon reception terminal 100*b* stores the coupon 101 (S170). Further, the coupon issuance server 300 accumulates information on the user U in a behavior history 321 (S180). Herein, information indicating the behavior of the user U in the space in which the service is provided can be accumulated in the behavior history 321. For example, it is possible to specify at which position in the space the user has captured illumination light by adding, to illumination light controlled by the illumination modulation apparatus 200*f*, a temporal modulation component that is different at each position in the space while showing the same coupon code.

Figure 20:
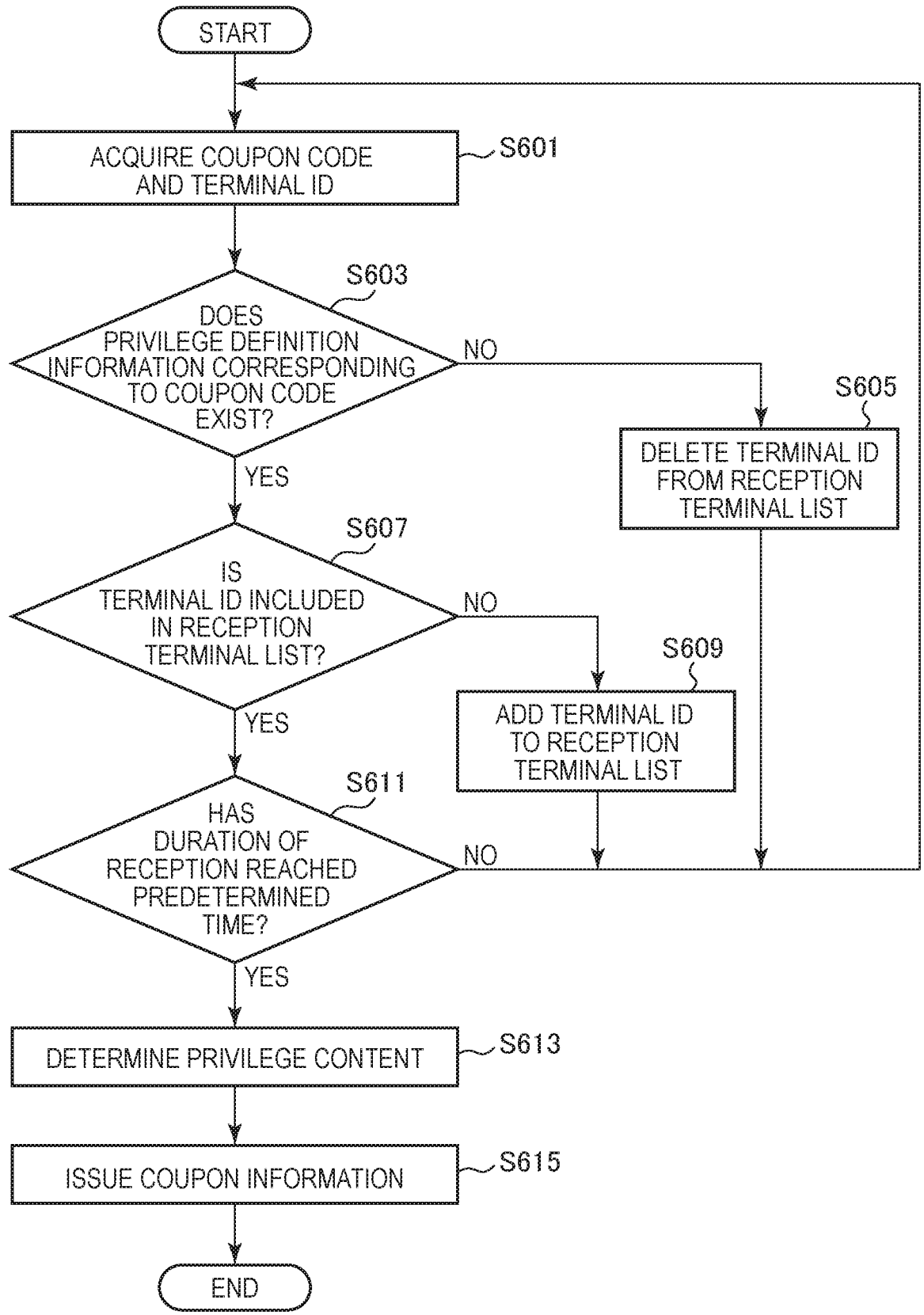
FIG. 20 is a flowchart showing an example of processing of a coupon issuance server in the sixth embodiment of the present disclosure.

FIG. 20 is a flowchart showing an example of processing of the coupon issuance server in the sixth embodiment of the present disclosure. When referring to FIG. 20, first, the coupon issuance server 300 acquires a coupon code transmitted from the coupon reception terminal 100*b* and a terminal ID of the coupon reception terminal 100*b* (S601). Then, the coupon issuance server 300 determines whether or not the privilege definition information 305 (see FIG. 3) corresponding to the acquired coupon code is registered (S603). Herein, in a case where the privilege definition information 305 corresponding to the coupon code is registered, the coupon issuance server 300 further determines whether or not the terminal ID of the coupon reception terminal 100*b* is included in a reception terminal list (S607). As described above, in the present embodiment, continuous reception of the coupon code from the coupon reception terminal 100*b* for a predetermined time or more is a condition of coupon issuance. In the example shown in FIG. 20, the coupon issuance server 300 determines the above condition by registering, in the reception terminal list, the terminal ID of the coupon reception terminal 100*b* that has received the coupon code.

In a case where the terminal ID of the coupon reception terminal 100*b* is not included in the reception terminal list in the determination in S607, the coupon issuance server 300 adds the terminal ID to the reception terminal list (S609). With this, in the coupon issuance server 300, the coupon reception terminal 100*b* is treated as a terminal device that transmits the coupon code. On the contrary, in a case where the privilege definition information 305 corresponding to the coupon code received from the coupon reception terminal 100*b* is not registered in the above determination in S603, the coupon issuance server 300 deletes the terminal ID when the terminal ID is registered in the reception terminal list (S605). Deletion of the terminal ID is executed in a case where, for example, the coupon code is changed in the middle. In this case, a coupon to be provided is changed, and therefore the coupon issuance server 300 resets a history of reception of the coupon code from the coupon reception terminal 100*b*. Note that, in a case where the terminal ID of the coupon reception terminal 100*b* is not registered in the reception terminal list, the processing in S605 is skipped.

On the contrary, in a case where the terminal ID of the coupon reception terminal 100*b* is already included in the reception terminal list in the above determination in S607, the coupon issuance server 300 determines whether or not duration of reception reaches a predetermined time (S611). Herein, the duration of reception can be an elapsed time after the terminal ID of the coupon reception terminal 100*b* is added to the reception terminal list in S609. In a case where the duration of reception reaches a predetermined time, a privilege content is determined on the basis of the privilege definition information 305 corresponding to the coupon code (S613), and light of coupon information is emitted in accordance with the determined privilege content (S615). Note that, in a case where the duration of reception does not reach the predetermined time in S611 described above, in a case where the terminal ID is added in S609, and in a case where the terminal ID is deleted in S605 (including a case where S605 is skipped), the coupon issuance server 300 waits transmission of the coupon code and the terminal ID from the coupon reception terminal 100b again (S601).

In the sixth embodiment of the present disclosure as described above, a service is provided in a space in which lighting is placed. As described above, an object does not necessarily need to be provided in the service. The coupon reception terminal 100b captures illumination light or reflected light thereof while the service is being used. Although the camera of the coupon reception terminal 100b is used in the above examples as a configuration therefor, the present disclosure is not limited to this example, and, for example, an illuminance sensor that does not have an imaging function may be used. Herein, the illumination light is temporally modulated in accordance with a coupon code as in the above fifth embodiment. Therefore, the illumination light or reflected light thereof to be captured is also temporally modulated in accordance with the coupon code. Thus, it is possible to extract key information for coupon issuance from a temporal modulation component of the captured light as in the above embodiments. In the above example, the coupon reception terminal 100b continuously transmits key information extracted from a temporal modulation component of light, more specifically, a coupon code to the coupon issuance server 300, and, in a case where the coupon code is continuously received for a predetermined time or more, the coupon issuance server 300 issues a coupon. The present disclosure is not limited to this example, and the illumination light or the reflected light thereof may be captured for a predetermined time (the predetermined time may be a short time as long as a temporal modulation component can be detected) when, for example, the user executes coupon acquisition operation in the coupon reception terminal 100b.

With the above configuration, for example, it is possible to realize issuance of a coupon using a coupon code in a wide variety of services as long as the services are provided in a space in which lighting is placed. Further, by issuing a coupon in a case where the coupon code is continuously received for a predetermined time or more, it is possible to encourage a customer to stay in a space in which the service is provided for a long time. In this case, the customer does not need to take an image of a specified apparatus such as a display, a commercial product, or the like and can freely move in the space. In other words, in the above case, it is possible to encourage the customer to stay in the space for a long time without restricting a behavior of the customer in the space in which the service is provided.

7. Hardware Configuration

A hardware configuration of an information processing apparatus according to an embodiment of the present disclosure will be described with reference to FIG. 21. FIG. 21 is a block diagram showing a hardware configuration example of an information processing apparatus according to an embodiment of the present disclosure. An information processing apparatus 900 shown in FIG. 21 can realize, for example, each apparatus constituting the system in the above embodiments.

The information processing apparatus 900 includes a central processing unit (CPU) 901, read only memory (ROM) 903, and random access memory (RAM) 905. In addition, the information processing apparatus 900 may include a host bus 907, a bridge 909, an external bus 911, an interface 913, an input apparatus 915, an output apparatus 917, a storage apparatus 919, a drive 921, a connection port 923, and a communication apparatus 925. Moreover, the information processing apparatus 900 may include an imaging apparatus 933, and a sensor 935, as necessary. The information processing apparatus 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing apparatus 900 in accordance with various programs recorded in the ROM 903, the RAM 905, the storage apparatus 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input apparatus 915 is a device operated by a user such as a mouse, a keyboard, a touch panel, a button, a switch, and a lever. The input apparatus 915 may be a remote control device that uses, for example, infrared radiation and another type of radiowave. Alternatively, the input apparatus 915 may be an external connection apparatus 929 such as a mobile phone that corresponds to an operation of the information processing apparatus 900. The input apparatus 915 includes an input control circuit that generates input signals on the basis of information which is input by a user to output the generated input signals to the CPU 901. A user inputs various types of data to the information processing apparatus 900 and instructs the information processing apparatus 900 to perform a processing operation by operating the input apparatus 915.

The output apparatus 917 includes an apparatus that can report acquired information to a user visually, audibly, or haptically. The output apparatus 917 may be, for example, a display device such as a liquid crystal display (LCD) or an organic electro-luminescence (EL) display, an audio output apparatus such as a speaker or a headphone, or a vibrator. The output apparatus 917 outputs a result obtained through a process performed by the information processing apparatus 900, in the form of video such as text and an image, sounds such as voice and audio sounds, or vibration.

The storage apparatus 919 is an apparatus for data storage that is an example of a storage unit of the information processing apparatus 900. The storage apparatus 919 includes, for example, a magnetic storage device such as a hard disk drive (HDD), a semiconductor storage device, an optical storage device, or a magneto-optical storage device. The storage apparatus 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing apparatus 900. The drive 921 reads out information recorded on the mounted removable recording medium 927, and outputs the information to the RAM 905. The drive 921 writes the record into the mounted removable recording medium 927.

The connection port 923 is a port used to connect devices to the information processing apparatus 900. The connection port 923 may include a Universal Serial Bus (USB) port, an IEEE1394 port, and a Small Computer System Interface (SCSI) port. The connection port 923 may further include an RS-232C port, an optical audio terminal, a High-Definition Multimedia Interface (HDMI) (registered trademark) port, and so on. The connection of the external connection device 929 to the connection port 923 makes it possible to exchange various data between the information processing apparatus 900 and the external connection device 929.

The communication apparatus 925 is a communication interface including, for example, a communication device for connection to a communication network 931. The communication apparatus 925 may be, for example, a communication card for a local area network (LAN), Bluetooth (registered trademark), Wi-Fi, or a wireless USB (WUSB). The communication apparatus 925 may also be, for example, a router for optical communication, a router for asymmetric digital subscriber line (ADSL), or a modem for various types of communication. For example, the communication apparatus 925 transmits and receives signals in the Internet or transits signals to and receives signals from another communication device by using a predetermined protocol such as TCP/IP. The communication network 931 to which the communication apparatus 925 connects is a network established through wired or wireless connection. The communication network 931 may include, for example, the Internet, a home LAN, infrared communication, radio communication, or satellite communication.

The imaging apparatus 933 is an apparatus that takes an image of a real space by using an image sensor such as a charge coupled device (CCD) and a complementary metal oxide semiconductor (CMOS), and various members such as a lens for controlling image formation of a subject image onto the image sensor, and generates the taken image. The imaging apparatus 933 may take a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing apparatus 900 such as a posture of a housing of the information processing apparatus 900, and information regarding an environment surrounding the information processing apparatus 900 such as luminous intensity and noise around the information processing apparatus 900. The sensor 935 may include a global positioning system (GPS) receiver that receives GPS signals to measure latitude, longitude, and altitude of the apparatus.

The example of the hardware configuration of the information processing apparatus 900 has been described. Each of the structural elements described above may be configured by using a general purpose component or may be configured by hardware specialized for the function of each of the structural elements. The configuration may be changed as necessary in accordance with the state of the art at the time of working of the present disclosure.

For example, in a case where the terminal device in the examples of the embodiments in the present disclosure described above is realized by the information processing apparatus 900, a capturing unit for capturing light while a service is being used can be realized by an illuminance sensor included in the imaging apparatus 933 or the sensor 935. Further, a transmission unit for transmitting key information based on a spatial or temporal modulation component of light to a server and a reception unit for receiving coupon information related to the service transmitted from the server can be realized by the communication apparatus 925. Further, in a case where the terminal device extracts key information for coupon acquisition from a temporal modulation component of light or detects a subject on the basis of a spatial modulation component of light, operation for the processing can be executed by the CPU 901.

Further, for example, in a case where the server in the examples of the embodiments in the present disclosure described above is realized by the information processing apparatus 900, a reception unit for receiving key information from a terminal device and a transmission unit for transmitting coupon information to the terminal device can be realized by the communication apparatus 925. Further, operation for issuing a coupon in accordance with key information (coupon code or the like) received from the terminal device can be executed by the CPU 901. In addition, operation for detecting a subject on the basis of a spatial modulation component of light provided as key information can also be executed by the CPU 901.

8. Supplement

The embodiments of the present disclosure may include, for example, the above-described information processing apparatus, the above-described system, the information processing method executed by the information processing apparatus or the system, a program for causing the information processing apparatus to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A method for providing a coupon by using a terminal device and at least one server configured to provide a service to the terminal device, the method including:

capturing light while the service is being used, transmitting key information based on a spatial or temporal modulation component of the light to the server, and receiving coupon information related to the service transmitted from the server by using the terminal device; and receiving the key information from the terminal device and issuing the coupon information in accordance with the key information by using the server.

(2)

The method for providing a coupon according to (1), wherein the service includes provision of an image, the light has a spatial or temporal part of display light of the image, and the coupon information relates to a subject of the image, the subject being included in the part.

(3)

The method for providing a coupon according to (2), further including detecting the subject by using the server on a basis of a spatial modulation component of the display light included in the key information.

(4)

The method for providing a coupon according to (2), further including detecting the subject by using the terminal device on a basis of a spatial modulation component of the display light.

(5)

The method for providing a coupon according to any one of (1) to (4), wherein the service includes provision of an image, the light includes display light of the image, and the key information is extracted from a temporal modulation component of the display light.

(6)

The method for providing a coupon according to (5), wherein the service includes provision of a stage performance, and the image is displayed as a background of the stage performance.

(7)

The method for providing a coupon according to (6), wherein the terminal device captures an image of a performer in the stage performance together with the display light, and the coupon information relates to the performer.

(8)

The method for providing a coupon according to (1), wherein the service includes provision of a commercial product, the light includes display light of an information image regarding the commercial product, and the key information is extracted from a temporal modulation component of the display light.

(9)

The method for providing a coupon according to (1), wherein the service includes provision of a commercial product in a space of a store in which lighting is placed, and a temporal modulation component is added to illumination light generated by the lighting, the light includes reflected light obtained by reflecting the illumination light on the commercial product, and the key information is extracted from a temporal modulation component of the reflected light.

(10)

The method for providing a coupon according to (9), further including detecting the commercial product by using the terminal device on a basis of a spatial modulation component of the reflected light, wherein the coupon information relates to the commercial product.

(11)

The method for providing a coupon according to (9), further including:

detecting the commercial product by using the server on a basis of a spatial modulation component of the reflected light included in the key information, wherein the coupon information relates to the commercial product.

(12)

The method for providing a coupon according to any one of (1) to (11), wherein the service is provided in a space in which lighting is placed, and a temporal modulation component is added to illumination light generated by the lighting, the light includes the illumination light or reflected light of the illumination light, and the key information is extracted from a temporal modulation component of the illumination light or the reflected light.

(13)

The method for providing a coupon according to (12), wherein the key information is continuously transmitted from the terminal device to the server, and the coupon information is issued in a case where the key information is continuously received for a predetermined time or more.

(14)

A system including:

a terminal device; and at least one server configured to provide a service to the terminal device, wherein the terminal device includes a capturing unit configured to capture light while the service is being used, a transmission unit configured to transmit key information based on a spatial or temporal modulation component of the light to the server, and a reception unit configured to receive coupon information related to the service transmitted from the server, and the server includes a reception unit configured to receive the key information from the terminal device, a coupon issuance unit configured to issue the coupon information in accordance with the key information, and a transmission unit configured to transmit the coupon information to the terminal device.

REFERENCE SIGNS LIST

10, 11, 20, 30, 40, 50, 60 system
100 terminal device
105 display
200 video distribution server
300 coupon issuance server
303 storage unit
305 privilege definition information
307 privilege target information
309 privilege content information
311 subject extraction unit
313 privilege search unit
315 privilege content determination unit

The invention claimed is:

1. A method, comprising:
in a system that comprises a terminal device and at least one server:
receiving, by the terminal device, content and a coupon code corresponding to the content;
capturing, by the terminal device, light corresponding to a specific region from the content based on a user input and utilization of a service, wherein
the service includes provision of a first image of the content,
the light includes a spatial part of display light of the first image, and the specific region of the first image includes a subject;
transmitting, by the terminal device, key information to the at least one server, wherein
the key information includes a spatial modulation component of the display light of the first image and the coupon code, and
the spatial modulation component is associated with the spatial part;
receiving, by the at least one server, the key information from the terminal device;
determining, by the at least one server, existence of privilege information corresponding to the coupon code;
extracting, by the at least one server, the subject from the specific region of the first image based on an image recognition operation and a determination that the privilege information corresponding to the coupon code exists;
determining, by the at least one server, existence of privilege information corresponding to the extracted subject based on the extraction of the subject;
determining, by the at least one server, privilege content based on the privilege information corresponding to the coupon code and the privilege information corresponding to the extracted subject;
issuing, by the at least one server, coupon information based on the determined privilege content;
receiving, by the terminal device, the issued coupon information from the at least one server; and
displaying, by the terminal device, an image of the issued coupon information along with the captured light in real time.

2. The method according to claim 1, wherein
the light further includes a temporal part of the display light of the first image, and
one of the spatial part or the temporal part includes the subject.

3. The method according to claim 2, further comprising detecting, by the at least one server, the subject based on the spatial modulation component of the display light of the first image.

4. The method according to claim 2, further comprising detecting, by the terminal device, the subject based on the spatial modulation component of the display light of the first image.

5. The method according to claim 1, further comprising extracting, by the terminal device, the key information from a temporal modulation component of the display light of the first image.

6. The method according to claim 5, wherein
the service further includes provision of a stage performance, and
the first image is displayable as a background of the stage performance.

7. The method according to claim 6, further comprising capturing, by the terminal device, the display light of the first image and a second image of a performer in the stage performance, wherein the coupon information is further associated with the performer.

8. The method according to claim 1, wherein
the service further includes provision of a commercial product,
the light further includes display light of an information image,
the information image is associated with the commercial product, and
the method further comprises extracting, by the terminal device, the key information from a temporal modulation component of the display light of the information image.

9. The method according to claim 1, wherein
the service further includes provision of a commercial product in a space of a store,
the space of the store has lighting,
a temporal modulation component of the lighting is added to illumination light,
the illumination light is generated by the lighting,
the light further includes reflected light,
the reflected light is the illumination light that is reflected on the commercial product, and
the method further comprises extracting, by the terminal device, the key information from a temporal modulation component of the reflected light.

10. The method according to claim 9, further comprising detecting, by the terminal device, the commercial product based on a spatial modulation component of the reflected light,
wherein the coupon information is further associated with the commercial product.

11. The method according to claim 9, further comprising detecting, by the at least one server, the commercial product based on a spatial modulation component of the reflected light, wherein
the spatial modulation component of the reflected light is included in the key information, and
the coupon information is further associated with the commercial product.

12. The method according to claim 1, wherein
the service is provided in a space that has lighting,
a temporal modulation component of the lighting is added to illumination light,
the illumination light is generated by the lighting,
the light further includes one of the illumination light or reflected light of the illumination light, and
the method further comprises extracting, by the terminal device, the key information from one of a temporal modulation component of the illumination light or a temporal modulation component of the reflected light.

13. The method according to claim 12, further comprising:
continuously transmitting the key information from the terminal device to the at least one server; and
issuing, by the at least one server, the coupon information based on the key information that is continuously received for greater than or equal to a specific time.

14. A system, comprising:
a terminal device; and
at least one server configured to provide a service to the terminal device, wherein
the terminal device is configured to:
receive content and a coupon code corresponding to the content;
capture light corresponding to a specific region from the content based on a user input and utilization of the service, wherein
the service includes provision of an image of the content,
the light includes a spatial part of display light of the image, and
the specific region of the image includes a subject;
transmit key information to the at least one server, wherein the key information includes a spatial modulation component of the display light of the image and the coupon code, and the spatial modulation component is associated with the spatial part;

receive, from the at least one server, coupon information based on the coupon code and the subject; and display an image of the coupon information along with the captured light in real time, and the at least one server is further configured to:

receive the key information from the terminal device;

determine existence of privilege information corresponding to the coupon code:

extract the subject from the specific region of the image based on an image recognition operation and a determination that the privilege information corresponding to the coupon code exists;

determine existence of privilege information corresponding to the extracted subject based on the extraction of the subject;

determine privilege content based on the privilege information corresponding to the coupon code and the privilege information corresponding to the extracted subject;

issue the coupon information based on the determined privilege content; and transmit the coupon information to the terminal device.

* * * * *